US011366539B2

(12) United States Patent
Shin et al.

(10) Patent No.: US 11,366,539 B2
(45) Date of Patent: Jun. 21, 2022

(54) DISPLAY DEVICE

(71) Applicant: Samsung Display Co., Ltd., Yongin-si (KR)

(72) Inventors: YongHwan Shin, Asan-si (KR); Hyo-Sang Yang, Yongin-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 0 days.

(21) Appl. No.: 17/079,227

(22) Filed: Oct. 23, 2020

(65) Prior Publication Data

US 2021/0165518 A1 Jun. 3, 2021

(30) Foreign Application Priority Data

Dec. 3, 2019 (KR) ........................ 10-2019-0159059

(51) Int. Cl.
*G06F 3/041* (2006.01)
*G06F 3/044* (2006.01)
*G09G 3/3266* (2016.01)
*G09G 3/3275* (2016.01)
*G09G 3/3258* (2016.01)

(52) U.S. Cl.
CPC ............ *G06F 3/0412* (2013.01); *G06F 3/044* (2013.01); *G06F 3/04164* (2019.05); *G06F 3/04166* (2019.05); *G09G 3/3266* (2013.01); *G09G 3/3275* (2013.01); *G06F 2203/04112* (2013.01); *G09G 3/3258* (2013.01); *G09G 2310/061* (2013.01); *G09G 2310/08* (2013.01)

(58) Field of Classification Search
CPC .............. G06F 3/0412; G06F 3/04166; G06F 3/04164; G06F 3/044; G06F 2203/04112; G09G 3/3266; G09G 3/3275; G09G 3/3258; G09G 2310/061; G09G 2310/08
See application file for complete search history.

(56) References Cited

U.S. PATENT DOCUMENTS

| 9,632,629 | B2 | 4/2017 | Prendergast et al. |
| 2018/0151143 | A1 | 5/2018 | Kim |
| 2018/0356932 | A1* | 12/2018 | Shepelev ............ G06F 3/04164 |

FOREIGN PATENT DOCUMENTS

| KR | 10-2015-0055707 A | 5/2015 |
| KR | 10-2018-0062223 A | 6/2018 |

* cited by examiner

*Primary Examiner* — Peter D McLoone
(74) *Attorney, Agent, or Firm* — Lewis Roca Rothgerber Christie LLP

(57) ABSTRACT

A display device includes a display panel to display an image for each of frame periods, and an input sensing unit directly on the display panel to sense a user input. A display device further includes a first driver to control driving of the display panel and a second driver to control driving of the input sensing unit. The frame period includes a display period and a blank period adjacent to the display period. The duration of the blank period may vary randomly during a set reference period.

19 Claims, 16 Drawing Sheets

DISPLAY DEVICE

CROSS-REFERENCE TO RELATED APPLICATION

This application claims priority to and the benefit of Korean Patent Application No. 10-2019-0159059, filed on Dec. 3, 2019, the entire content of which is hereby incorporated by reference.

BACKGROUND

1. Field

The present disclosure herein relates to a display device, and more particularly, to a display device with improved display quality.

2. Description of the Related Art

Underway is the development of electronic devices such as a smartphone, a tablet, a laptop computer, and a smart television. These electronic devices include a display device to provide information. The electronic devices further include various suitable electronic modules in addition to the display device.

The display device includes an input sensing panel as an input device. The input sensing panel may be disposed on a display panel that displays an image.

SUMMARY

Aspects of embodiments of the present disclosure are directed toward a display device that prevents display quality from being degraded, or reduces the extent that the display quality is degraded, by signal interference between an input sensing unit and a display panel.

An embodiment of the present disclosure provides a display device including a display panel configured to display an image for each of frame periods comprising a frame period, an input sensing unit directly on the display panel to sense a user input, a first driver configured to control driving of the display panel, and a second driver configured to control driving of the input sensing unit.

In an embodiment, the frame period may include a display period and a blank period adjacent to the display period. The duration of the blank period may vary randomly during a set reference period.

In an embodiment of the present disclosure, a display device includes a display panel configured to display an image, an input sensing unit directly on the display panel and configured to sense a user input for each of sensing frame periods, a first driver configured to control driving of the display panel, and a second driver configured to control driving of the input sensing unit.

In an embodiment, the sensing frame period may include a sensing period and a porch period adjacent to the sensing period. The duration of the porch period may vary randomly during a set reference period.

BRIEF DESCRIPTION OF THE FIGURES

The accompanying drawings are included to provide further understanding of the present disclosure, and are incorporated in and constitute a part of this specification. The drawings illustrate example embodiments of the present disclosure and, together with the description, serve to describe principles of the present disclosure. In the drawings.

DETAILED DESCRIPTION

Figure 1A:
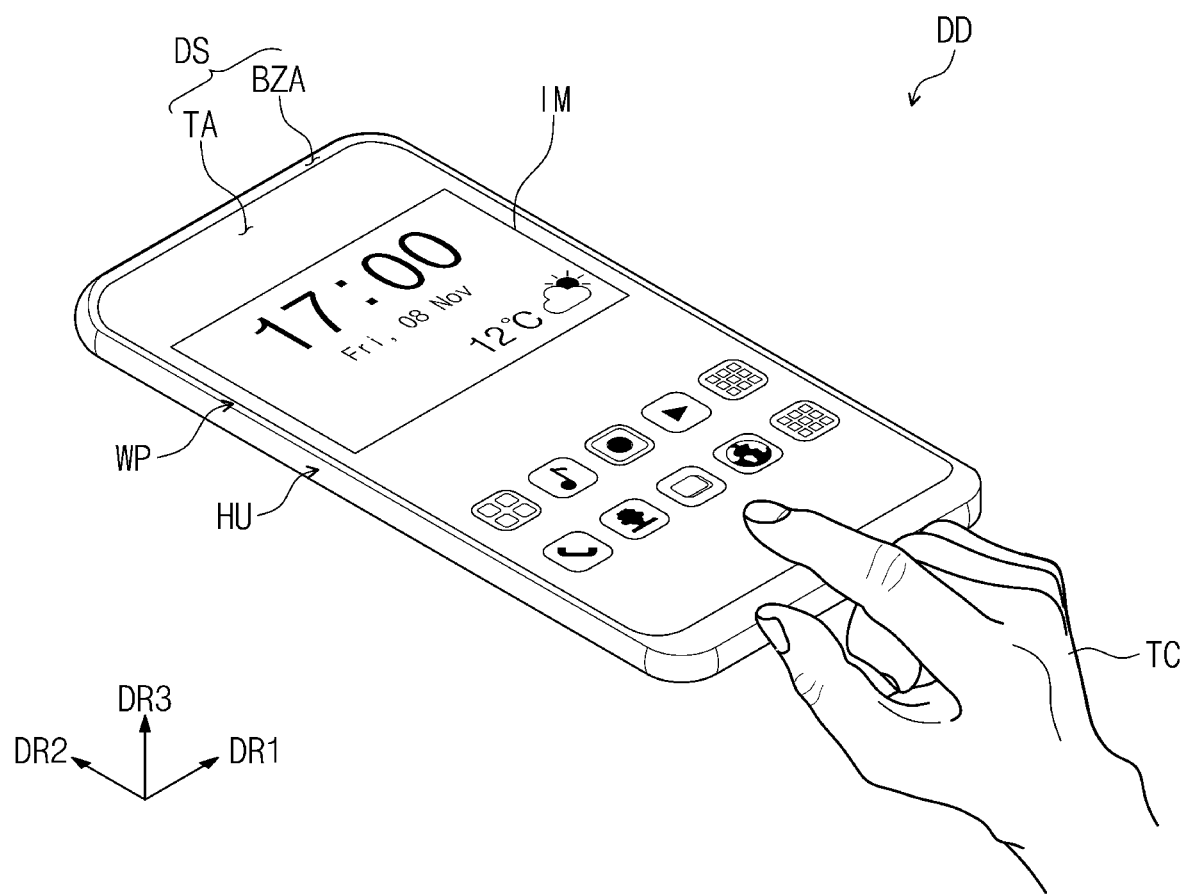
FIG. 1A is a perspective view of a display device according to an embodiment of the present disclosure.

As used herein, the use of the term "may," when describing embodiments of the present disclosure, refers to "one or more embodiments of the present disclosure." It will be understood that when an element or layer is referred to as being "on", "connected to" or "coupled to" another element or layer, it can be directly on, connected or coupled to the other element or layer, or intervening elements or layers may be present.

Like reference numerals refer to like elements throughout this specification. In the figures, the thicknesses, ratios and dimensions of elements may be exaggerated for effective description of the technical contents. As used herein, the term "substantially," "about," "approximately," and similar terms are used as terms of approximation and not as terms of degree, and are intended to account for the inherent deviations in measured or calculated values that would be recognized by those of ordinary skill in the art.

As used herein, the term "and/or" includes any and all combinations of one or more of the associated listed items.

It will be understood that, although the terms first, second, etc. may be used herein to describe various elements, components, regions, layers and/or sections, these elements, components, regions, layers and/or sections should not be limited by these terms. These terms are only used to distinguish one element, component, region, layer or section from another element(s), component(s), region(s), layer(s) or section(s). Thus, a first element, component, region, layer or section discussed below could be termed a second element, component, region, layer or section without departing from the teachings of the present disclosure. As used herein, the singular forms, "a", "an" and "the" are intended to include the plural forms as well, unless the context clearly indicates otherwise.

Spatially relative terms, such as "beneath," "below," "lower," "above," and "upper," may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures.

Unless otherwise defined, all terms (including technical and scientific terms) used herein have the same meaning as would be commonly understood by one of ordinary skill in the art to which this present disclosure belongs. It will be further understood that terms, such as those defined in commonly used dictionaries, should be interpreted as having a meaning that is consistent with their meaning in the context of the relevant art and should not be interpreted in an idealized or overly formal sense unless expressly so defined herein.

It will be further understood that the terms "include" and "have", when used in this specification, specify the presence of stated features, integers, steps, operations, elements, and/or components, but do not preclude the presence or addition of one or more other features, integers, steps, operations, elements, components, and/or groups thereof.

Hereinafter, the present disclosure will be explained in more detail with reference to the accompanying drawings.

Figure 1B:
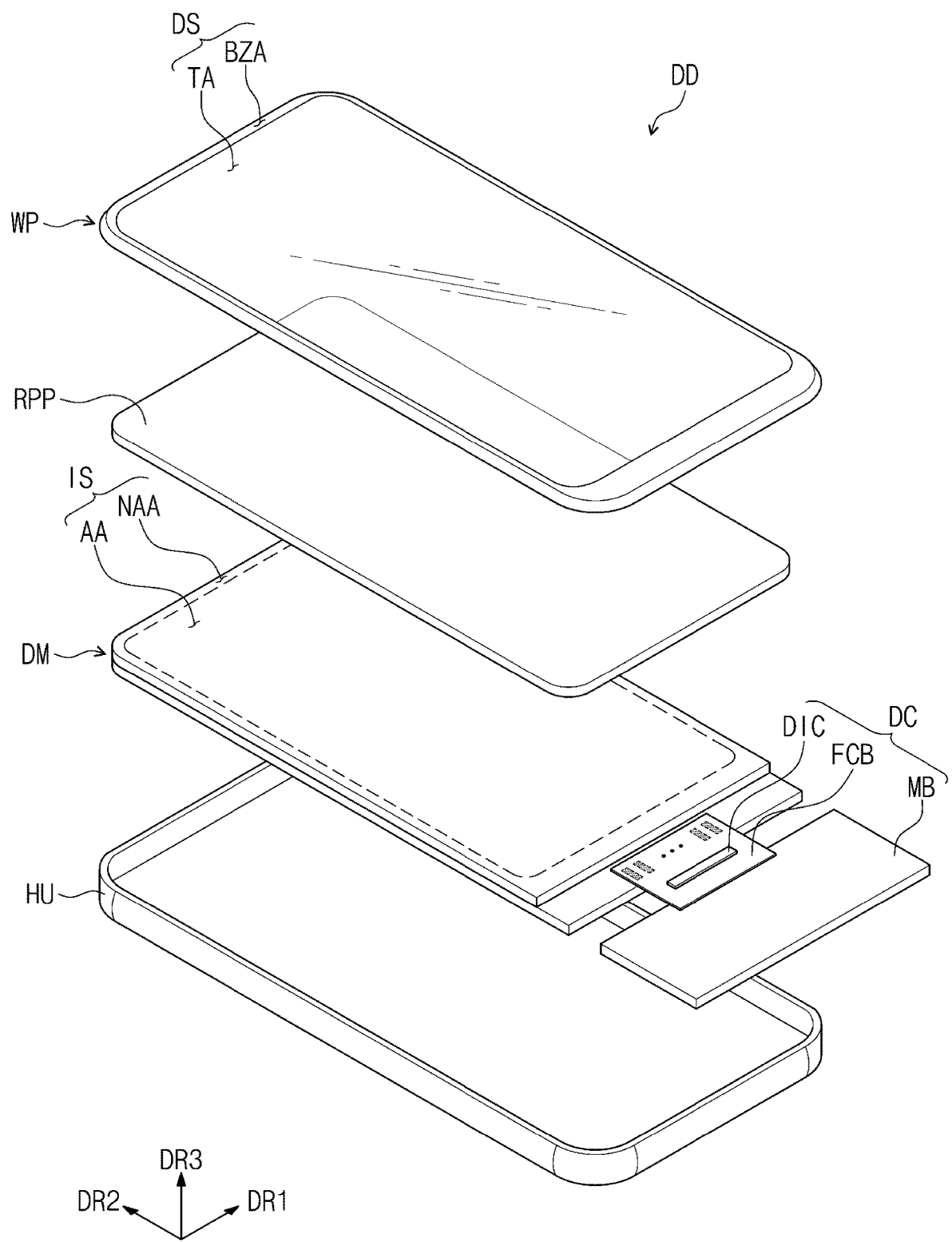
FIG. 1B is an exploded perspective view of a display device according to an embodiment of the present disclosure.
Figure 2:
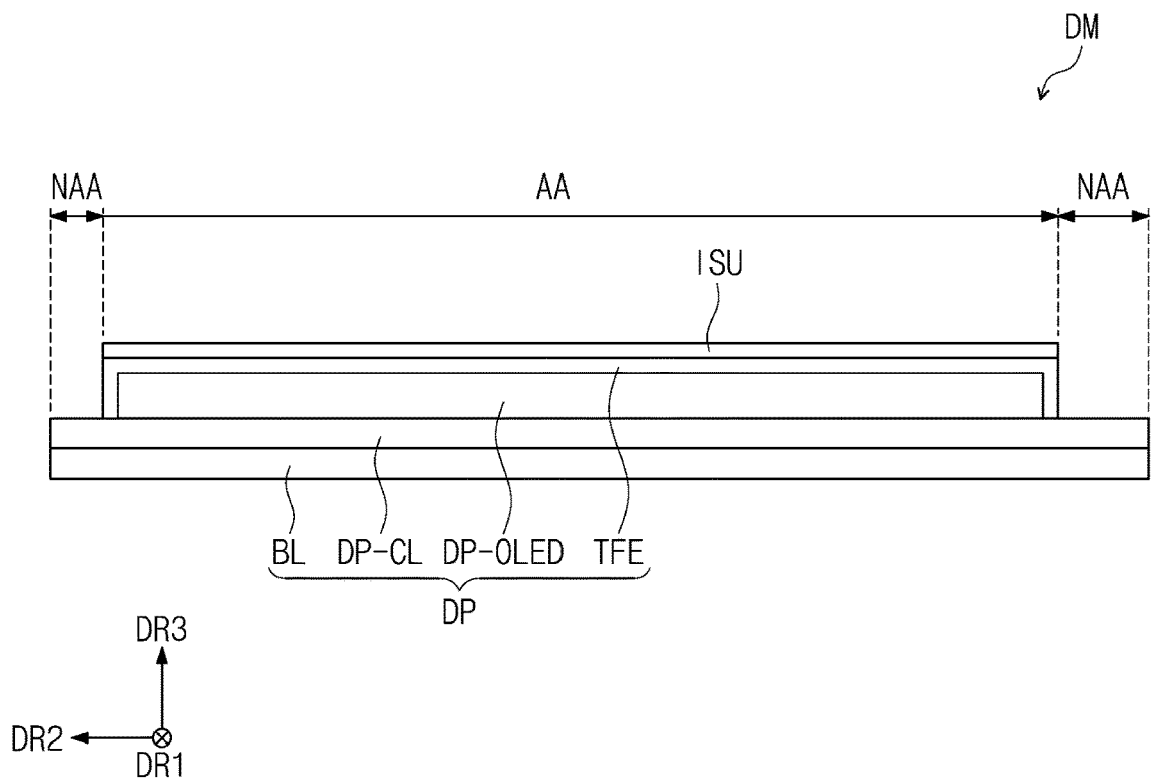
FIG. 2 is a cross-sectional view schematically illustrating a display module according to an embodiment of the present disclosure.

FIG. 1A is a perspective view of a display device according to an embodiment of the present disclosure, and FIG. 1B is an exploded perspective view of a display device according to an embodiment of the present disclosure. FIG. 2 is a cross-sectional view schematically illustrating a display module according to an embodiment of the present disclosure.

Referring to FIGS. 1A and 1B, a display device DD may be a device that is activated according to an electrical signal. The display device DD may be embodied in various suitable forms. For example, the display device DD may be utilized in a large-sized electronic device such as a television, a monitor, or an outdoor digital signage, or may be utilized in a medium- or small-sized electronic device such as a personal computer, a laptop computer, a personal digital assistant, a car navigation device, a game machine, a portable electronic device, or a camera. These are example embodiments, and the display device DD may also be employed in other electronic devices as long as the display device DD does not depart from the present disclosure. In the embodiments illustrated in FIGS. 1A and 1B, the display device DD is illustrated as a smartphone by way of example.

The display device DD may display an image IM toward a third direction DR3 on a display surface DS parallel (e.g., substantially parallel) to each of a first direction DR1 and a second direction DR2. For example, the display surface DS may be parallel (e.g., substantially parallel) to a plane defined by the first direction DR1 and the second direction DR2. The image IM may include a still image in addition to a dynamic image. A watch window and icons are illustrated in FIG. 1A as an example of the image IM. The display surface DS on which the image IM is displayed may correspond to a front surface of the display device DD and to a front surface of a window WP.

In this embodiment, a front surface (or a top surface) and a rear surface (or a bottom surface) of each member are defined in relation to a direction in which the image IM is displayed. The front surface and the rear surface of each member may face each other through the member in the third direction DR3, and a normal direction of each of the front surface and the rear surface may be parallel (e.g., substantially parallel) to the third direction DR3. Directions indicated by the first to third directions DR1 to DR3 are relative and may be converted into different directions. In this specification, "when viewed in a plane" may mean "when viewed in the third direction DR3".

The display device DD according to an embodiment of the present disclosure may sense a user input TC applied from the outside. The user input TC includes various suitable types or kinds of external inputs such as a part of a user's body, light, heat, and/or pressure. In some embodiments, the display device DD may sense the user input TC applied to the front surface (e.g., the display surface DS), but embodiments of the present disclosure are not limited thereto. In addition, the display device DD may sense, according to the structure thereof, the user input TC applied to a side surface or a rear surface of the display device DD, and is not limited to any one embodiment.

The display device DD may include the window WP, an anti-reflection panel RPP, a display module DM, and a housing HU. In this embodiment, the window WP and the housing HU combine (e.g., are coupled together) to form the appearance of the display device DD.

The window WP may include (e.g., be) an optically clear insulating material. For example, the window WP may include (e.g., be) glass and/or plastic. The window WP may have a multilayer structure or a single layer structure. For example, the window WP may include a plurality of plastic films bonded by an adhesive, or may include a glass substrate and a plastic film bonded by an adhesive.

As described above, the front surface of the window WP defines the display surface DS of the display device DD. A transmissive area TA may be an optically clear area. For example, the transmissive area TA may be an area having a visible light transmittance of about 90% or more.

A bezel area BZA may be an area having a lower light transmittance than the transmissive area TA. The bezel area BZA defines the shape of the transmissive area TA. The bezel area BZA may be adjacent to the transmissive area TA and may partially or entirely surround the transmissive area TA.

The bezel area BZA may have a predetermined or set color. The bezel area BZA may cover a peripheral area NAA of the display module DM to block the peripheral area NAA from being viewed from the outside. The bezel area BZA may be omitted from the window WP according to an embodiment of the present disclosure.

The anti-reflection panel RPP may be disposed below the window WP. The anti-reflection panel RPP reduces the reflectance of external light incident from above the window WP. In an embodiment of the present disclosure, the anti-reflection panel RPP may be omitted, and may be a component included in the display module DM. In some embodiments, the anti-reflection panel RPP may be omitted from the display device DD. In some embodiments, the anti-reflection panel RPP may be included in (e.g., may be an integral part of) the display module DM.

The display module DM may display the image IM and may sense the user input TC. The display module DM includes a front surface IS having an active area AA and the peripheral area NAA. The active area AA may be an area that is activated according to an electrical signal.

In this embodiment, the active area AA may be an area where the image IM is displayed and, also (e.g., at the same time), may be an area where the user input TC is sensed. The transmissive area TA overlaps at least the active area AA. For example, the transmissive area TA overlaps the entirety of or at least a portion of the active area AA. Accordingly, through the transmissive area TA, a user may view the image IM or may provide the user input TC. However, in some embodiments, and an area where the image IM is displayed and an area where an external input is sensed may be separated from each other in the active area AA and are not limited to any one embodiment.

The peripheral area NAA may be an area covered by the bezel area BZA. The peripheral area NAA is adjacent to the active area AA. The peripheral area NAA may partially or entirely surround the active area AA. A driving circuit, driving wires, or the like may be disposed in the peripheral area NAA to drive the active area AA.

A driving circuit unit DC is electrically connected to the display module DM. The driving circuit unit DC includes a main circuit board MB and a flexible circuit board FCB.

The main circuit board MB may include various suitable driving circuits for driving the display module DM, a connector for supplying power, and the like. The flexible circuit board FCB may be connected to the main circuit board MB and the display module DM. For example, the flexible circuit board FCB may be connected between the main circuit board MB and the display module DM to connect the main circuit board MB to the display module DM. The driving circuit unit DC may further include a driving chip DIC mounted on the flexible circuit board FCB. In an embodiment of the present disclosure, the driving chip DIC may be (e.g., may also be) mounted on or directly on the display module DM.

The housing HU combines with (e.g., is coupled to) the window WP. The housing HU combines with the window WP to provide a predetermined or set internal space. The display module DM may be accommodated in (e.g., may be located in) the internal space. The housing HU may include (e.g., be) a material having a high rigidity (e.g., a relatively high rigidity). For example, the housing HU may include (e.g., be) glass, plastic, and/or a metal, or may include a plurality of frames and/or plates including (e.g., consisting of) a combination thereof. The housing HU may securely protect the components of the display device DD accommodated in (e.g., located in) the internal space from external impact.

In some embodiments, a battery module for supplying power required for the overall operation of the display device DD, or the like, may be disposed between the display module DM and the housing HU.

Referring to FIGS. 1B and 2, the display module DM according to an embodiment may include a display panel DP and an input sensing unit ISU.

The display panel DP may display an image according to an electrical signal, and the input sensing unit ISU may sense the user input TC (illustrated in FIG. 1A) applied from the outside. The user input TC may include various suitable types or kinds of inputs provided from outside the display device DD. The user input TC may include an input (e.g., hovering) that is applied close to the display device DD or applied adjacently to the display device DD at a predetermined or set distance, in addition to contact by a part of a body, such as a user's hand. In addition, the user input TC may include various suitable types or kinds of inputs, such as force, pressure, temperature, and/or light.

Referring to FIG. 2, the display panel DP includes a base layer BL, a display circuit layer DP-CL, a display element layer DP-OLED, and an encapsulation layer TFE.

The base layer BL may include a synthetic resin film. A synthetic resin layer is formed on a working substrate utilized for manufacturing the display panel DP. Thereafter, a conductive layer, an insulating layer, and the like are formed on the synthetic resin layer. When the working substrate is removed, the synthetic resin layer corresponds to the base layer BL. The synthetic resin layer may be a polyimide resin layer, and the material thereof is not limited thereto. In addition, the base layer BL may include a glass substrate, a metal substrate, an organic/inorganic composite substrate, or the like.

The display circuit layer DP-CL is disposed on the base layer BL. The display circuit layer DP-CL includes at least one insulating layer and a circuit element. Hereinafter, the insulating layer included in the display circuit layer DP-CL is referred to as an intermediate insulating layer. The intermediate insulating layer includes at least one intermediate inorganic film and at least one intermediate organic film. The circuit element includes a signal line, a pixel driving circuit, and the like. The display circuit layer DP-CL may be formed through a process of forming the insulating layer, a semiconductor layer, and the conductive layer by coating, deposition, or the like, and through a process of patterning the insulating layer, the semiconductor layer, and the conductive layer by a photolithography process.

The display element layer DP-OLED may include an organic light emitting element and a pixel defining film. The display element layer DP-OLED will be described in more detail later with reference to FIG. 6B.

The encapsulation layer TFE encapsulates (e.g., covers) the display element layer DP-OLED. The encapsulation layer TFE may include at least one organic film and at least one inorganic film. The inorganic film(s) may protect the display element layer DP-OLED from moisture and/or oxygen. The inorganic film(s) may include a silicon nitride layer, a silicon oxynitride layer, a silicon oxide layer, a titanium oxide layer, an aluminum oxide layer, or the like, and is not limited thereto.

The input sensing unit ISU may be disposed directly on the display panel DP. According to an embodiment, the input sensing unit ISU may be disposed directly on the encapsulation layer TFE. As used herein, "being disposed directly on" excludes being attached by a separate adhesive layer. For example, an input sensing unit ISU that is disposed directly on the display panel DP may be formed by (e.g., during) a continuous process with the display panel DP.

The input sensing unit ISU includes sensing electrodes and sensing lines. The sensing electrodes and the sensing lines may have a single layer structure or a multilayer structure. The input sensing unit ISU will be described in more detail later with reference to FIG. 6B.

Figure 3:
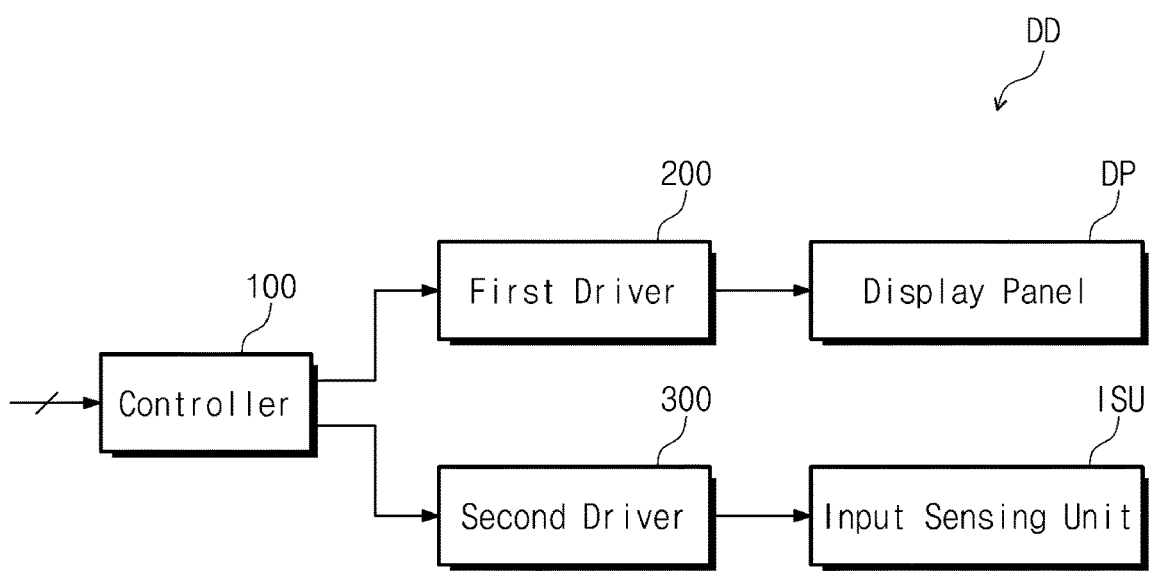
FIG. 3 is a block diagram of a display device according to an embodiment of the present disclosure.
Figure 4A:
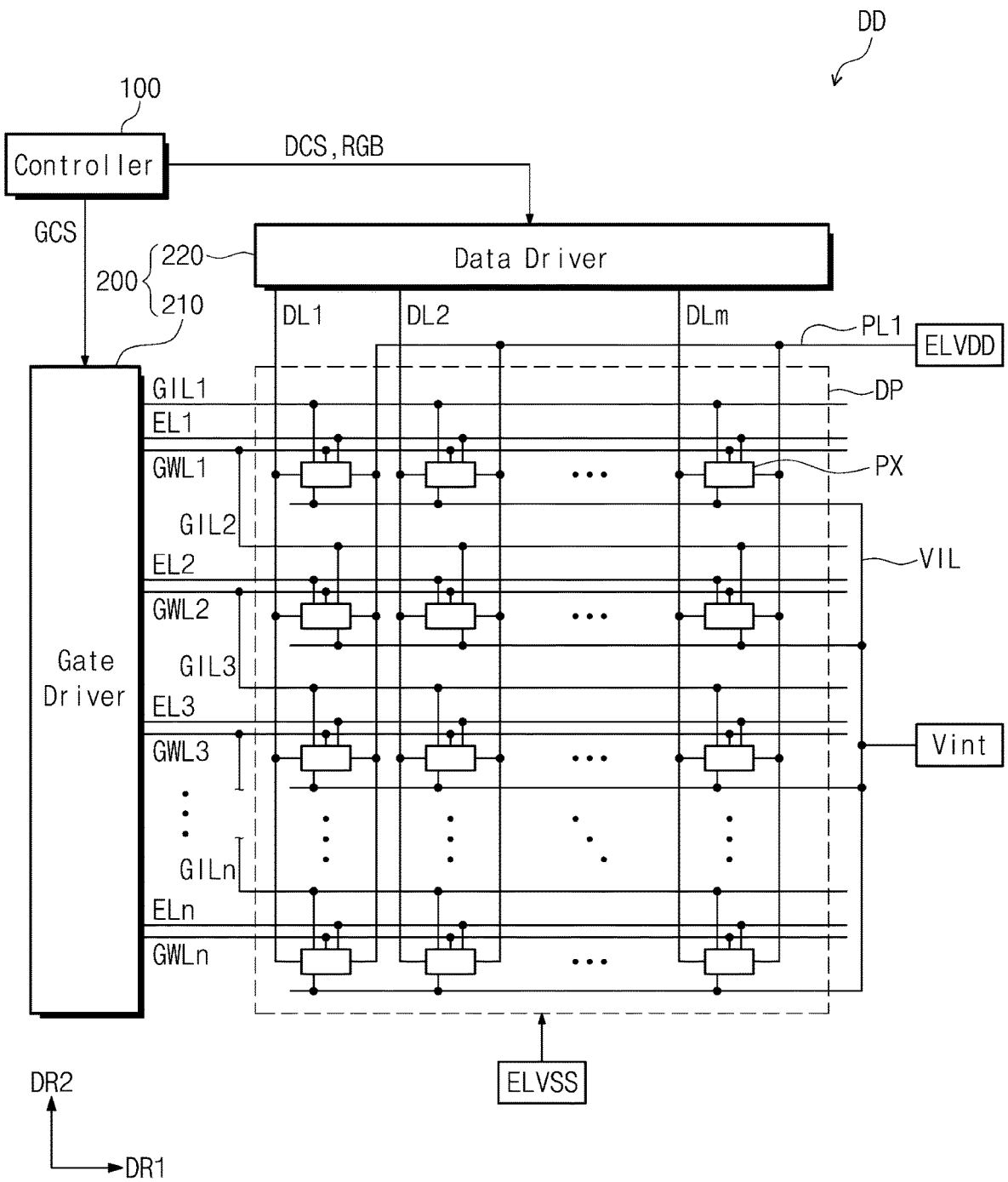
FIG. 4A is a block diagram of the first driver and the display panel illustrated in FIG. 3.
Figure 4B:
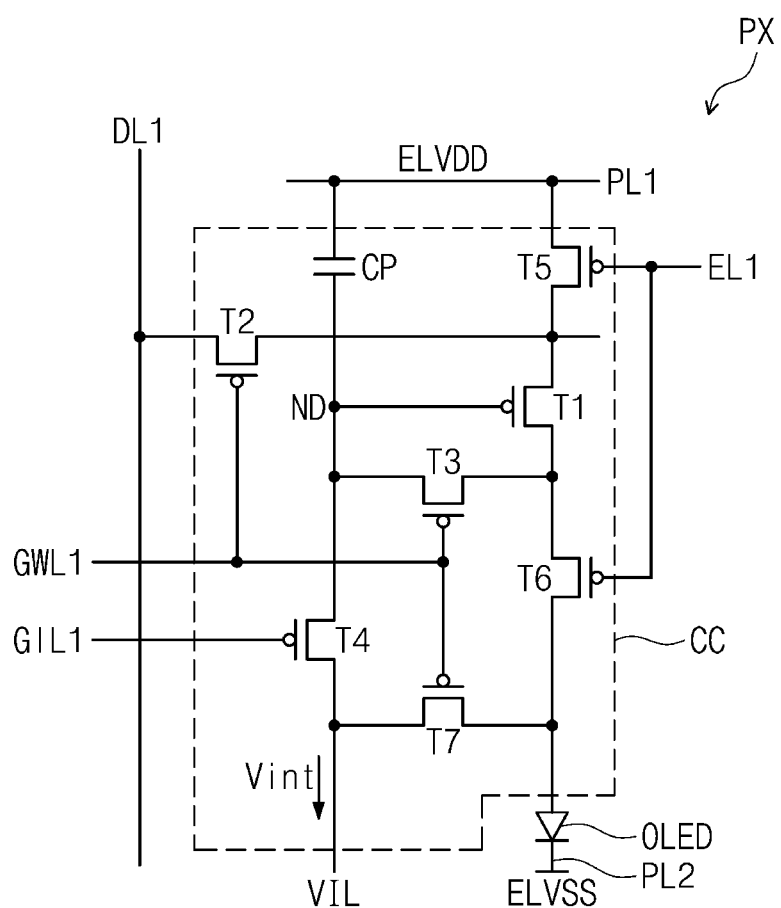
FIG. 4B is an equivalent circuit diagram of one of the pixels illustrated in FIG. 4A.
Figure 5:
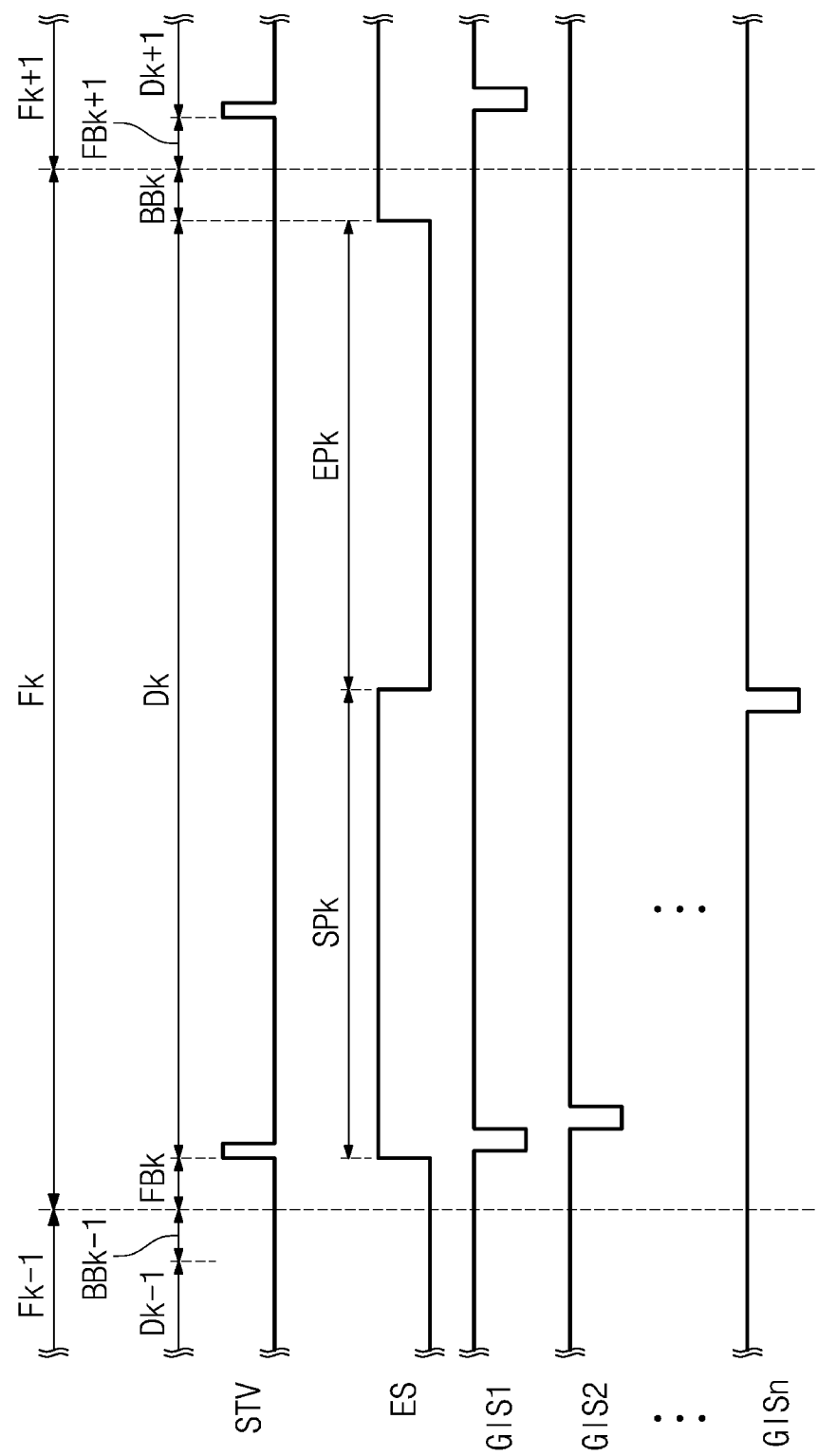
FIG. 5 is a waveform diagram illustrating driving signals for driving the pixel illustrated in FIG. 4B.

FIG. 3 is a block diagram of a display device according to an embodiment of the present disclosure, FIG. 4A is a block diagram of the first driver and the display panel illustrated in FIG. 3, and FIG. 4B is an equivalent circuit diagram of one of the pixels illustrated in FIG. 4A. FIG. 5 is a waveform diagram illustrating driving signals for driving the pixel illustrated in FIG. 4B.

Referring to FIGS. 3 and 4A, the display device DD further includes a first driver 200, a second driver 300, and a controller 100. The first driver 200 controls the driving of the display panel DP, and the second driver 300 controls the driving of the input sensing unit ISU. The first driver 200 may include a gate driver 210 and a data driver 220.

The controller 100 controls the driving of the first and second drivers 200 and 300. The controller 100 generates image data RGB by converting a data format of input image signals in accordance with an interface specification between the controller 100 and the data driver 220. The controller 100 outputs the image data RGB and a variety of control signals DCS and GCS.

The gate driver 210 receives a gate control signal GCS from the controller 100. The gate control signal GCS may include a vertical start signal for starting the operation of the gate driver 210, a clock signal for determining when signals are outputted, and the like. The gate driver 210 generates a plurality of gate signals and sequentially outputs the plurality of gate signals to a plurality of gate lines GIL1 to GILn and GWL1 to GWLn to be described later. In addition, the gate driver 210 generates a plurality of light emission control signals in response to the gate control signal GCS, and outputs the plurality of light emission control signals to a plurality of light emission control lines EL1 to ELn to be described later.

Although FIG. 4A illustrates the plurality of gate signals and the plurality of light emission control signals outputted from one gate driver 210, an embodiment of the present disclosure is not limited thereto. As an embodiment of the present disclosure, a driving circuit for generating and outputting the plurality of gate signals and a driving circuit for generating and outputting the plurality of light emission control signals may be provided separately.

The data driver 220 receives a data control signal DCS and the image data RGB from the controller 100. The data driver 220 converts the image data RGB into data signals and outputs the data signals to a plurality of data lines DL1 to DLm to be described later. The data signals are analog voltages corresponding to gradation values of the image data RGB.

The display panel DP includes the plurality of gate lines GIL1 to GILn and GWL1 to GWLn, the plurality of light emission control lines EL1 to ELn, the plurality of data lines DL1 to DLm, and a plurality of pixels PX. The plurality of gate lines GIL1 to GILn and GWL1 to GWLn extend in the first direction DR1 and are arranged in the second direction DR2 perpendicular to the first direction DR1. Each of the plurality of light emission control lines EU to ELn may be disposed side by side with a corresponding gate line from among the plurality of gate lines GIL1 to GILn and GWL1 to GWLn. For example, each of the plurality of light emission control lines EU to ELn may extend in the first direction DR1 and may be adjacent to a corresponding gate line from among the plurality of gate lines GIL1 to GILn and GWL1 to GWLn. The plurality of data lines DL1 to DLm cross the plurality of gate lines GIL1 to GILn and GWL1 to GWLn in an insulated manner. For example, the data lines DL1 to DLm may be electrically insulated from the gate lines GIL1 to GILn and GWL1 to GWLn.

Each of the plurality of pixels PX is connected to a corresponding gate line from among the plurality of gate lines GIL1 to GILn and GWL1 to GWLn, a corresponding light emission control line from among the plurality of light emission control lines EL1 to ELn, and a corresponding data line from among the plurality of data lines DL1 to DLm. Although FIG. 4A illustrates an example in which each of the plurality of pixels PX is connected to two gate lines from among the plurality of gate lines GIL1 to GILn and GWL1 to GWLn, an embodiment of the present disclosure is not limited thereto. For example, each of the pixels PX may be connected to three gate lines from among the plurality of gate lines GIL1 to GILn and GWL1 to GWLn.

The display panel DP receives a first driving voltage ELVDD and a second driving voltage ELVSS. The first driving voltage ELVDD may be provided to the plurality of pixels PX through a first power line PL1. The second driving voltage ELVSS may be provided to the plurality of pixels PX through electrodes formed in the display panel DP or through a second power line PL2 (illustrated in FIG. 4B).

The display panel DP receives an initialization voltage Vint. The initialization voltage Vint may be provided to the plurality of pixels PX through an initialization voltage line VIL.

Referring to FIG. 4B, each of the plurality of pixels PX includes a light emitting element OLED and a circuit unit CC for controlling light emission of the light emitting element OLED. The plurality of pixels PX may include red pixels to emit red light, green pixels to emit green light, and blue pixels to emit blue light. A light emitting element OLED of each of the red pixels, a light emitting element OLED of each of the green pixels, and a light emitting element OLED of each of the blue pixels may include organic light emitting layers of (e.g., including or consisting of) materials different from each other.

The circuit unit CC may include a plurality of transistors T1 to T7 and a capacitor CP. The plurality of transistors T1 to T7 and the capacitor CP may control the amount of current flowing into the light emitting element OLED in response to a corresponding data signal of the data signals and a corresponding gate signal of the gate signals.

Each of the plurality of transistors T1 to T7 may include an input electrode (or a source electrode), an output electrode (or a drain electrode), and a control electrode (or a gate electrode). In this specification, for convenience, one of the input electrode and the output electrode may be referred to as a first electrode, and the other as a second electrode. Hereinafter, for convenience of description, the plurality of transistors T1 to T7 are referred to as first to seventh transistors T1 to T7, respectively.

The first electrode of the first transistor T1 may be connected to the first power line PL1 via the fifth transistor T5. The first driving voltage ELVDD is provided to the first power line PL1. The second electrode of the first transistor T1 is connected to an anode of the light emitting element OLED via the sixth transistor T6.

The first transistor T1 may control the amount of current flowing into the light emitting element OLED in response to a voltage applied to the control electrode of the first transistor T1.

The second transistor T2 is connected between a first data line DL1 and the first electrode of the first transistor T1. The control electrode of the second transistor T2 is connected to a first current gate line GWL1. When a first current gate signal is provided to the first current gate line GWL1, the second transistor T2 is turned on to electrically connect the first data line DL1 to the first electrode of the first transistor T1.

The third transistor T3 is connected between the second electrode of the first transistor T1 and the control electrode of the first transistor T1. The control electrode of the third transistor T3 is connected to the first current gate line GWL1. When the first current gate signal is provided to the first current gate line GWL1, the third transistor T3 is turned on to electrically connect the second electrode of the first transistor T1 to the control electrode of the first transistor T1. Accordingly, the first transistor T1 is connected in the form of a diode when the third transistor T3 is turned on.

The fourth transistor T4 is connected between a node ND and the initialization voltage line VIL. The control electrode of the fourth transistor T4 is connected to a first previous gate line GIL1. The node ND may be a node to which the fourth transistor T4 and the control electrode of the first transistor T1 are connected. When a first previous gate signal is provided to the first previous gate line GIL1, the fourth transistor T4 is turned on to provide the initialization voltage Vint to the node ND.

The fifth transistor T5 is connected between the first power line PL1 and the first electrode of the first transistor T1. The sixth transistor T6 is connected between the second electrode of the first transistor T1 and the anode of the light emitting element OLED. The control electrode of the fifth transistor T5 and the control electrode of the sixth transistor T6 are connected to a first light emission control line EL1.

The seventh transistor T7 is connected between the initialization voltage line VIL and the anode of the light emitting element OLED. The control electrode of the seventh transistor T7 is connected to the first current gate line GWL1. When the first current gate signal is provided to the first current gate line GWL1, the seventh transistor T7 is turned on to provide the initialization voltage Vint to the anode of the light emitting element OLED.

The seventh transistor T7 may improve black display capability of the pixel PX. For example, when the seventh transistor T7 is turned on, a parasitic capacitor of the light emitting element OLED is discharged. Then, the light emitting element OLED does not emit light despite a leakage current from the first transistor T1 when black luminance is implemented, and thus the black display capability may be improved.

In addition, although the control electrode of the seventh transistor T7 is illustrated in FIG. 4B as being connected to the first current gate line GWL1, an embodiment of the present disclosure is not limited thereto. For example, the control electrode of the seventh transistor T7 may be connected to another gate line (for example, a second current gate line GWL2 illustrated in FIG. 4A) which provides a gate signal different from the first current gate signal.

Although the first to seventh transistors T1 to T7 are illustrated in FIG. 4B as PMOS transistors, the first to seventh transistors T1 to T7 are not limited thereto. For example, some or all of the first to seventh transistors T1 to T7 included in (e.g., constituting) the circuit unit CC may be composed of (e.g., may be) NMOS transistors.

The capacitor CP is disposed between the first power line PL1 and the node ND. The capacitor CP stores a voltage corresponding to the corresponding data signal. When the fifth transistor T5 and the sixth transistor T6 are turned on, the amount of current flowing through the first transistor T1 may be determined depending on the voltage stored in the capacitor CP.

The light emitting element OLED may be electrically connected to the sixth transistor T6 and the second power line PL2. The anode of the light emitting element OLED is connected to the sixth transistor T6, and a cathode of the light emitting element OLED is connected to the second power line PL2. The second driving voltage ELVSS may be applied to the second power line PL2. The second driving voltage ELVSS is lower than the first driving voltage ELVDD. Accordingly, the light emitting element OLED may emit light depending on a voltage corresponding to a difference between a signal (e.g., voltage) transmitted through the sixth transistor T6 and the second driving voltage ELVSS received through the second power line PL2.

Referring to FIG. 5, the display device DD displays a unit image for each of frame periods Fk−1, Fk, and Fk+1. Each of the pixels PX illustrated in FIG. 4A receives a corresponding data signal for each of the frame periods Fk−1, Fk, and Fk+1.

FIG. 5 illustrates the frame periods Fk−1, Fk, and Fk+1 of the pixel PX illustrated in FIG. 4B. Hereinafter, driving signals for driving the pixels PX will be described by mainly utilizing (e.g., by mainly referring to) a k-th frame period Fk.

The k-th frame period Fk includes blank periods FBk and BBk, and a display period Dk. The blank periods FBk and BBk may be respectively disposed (e.g., occur) between a display period Dk−1 and the display period Dk, and between the display period Dk and a display period Dk+1, and the blank periods FBk and BBk may be defined as periods in which the pixel PX does not operate. The blank periods FBk and BBk may include a front blank period FBk disposed (e.g., occurring) before the display period Dk and a back blank period BBk disposed (e.g., occurring) after the display period Dk.

The display period Dk may include a scan period SPk and a light emission period EPk. First to n-th gate signals GIS1 to GISn are activated during the scan period SPk. In this embodiment, the first to n-th gate signals GIS1 to GISn illustrated in FIG. 5 are described as being activated when the same have a low level. The low level of the first to n-th gate signals GIS1 to GISn illustrated in FIG. 5 may be a turn-on voltage of a transistor to which a corresponding signal of the first to n-th gate signals GIS1 to GISn is applied. For example, the low level of each of the first to n-th gate signals GIS1 to GISn illustrated in FIG. 5 may be a turn-on voltage of a corresponding transistor to which the gate signal is applied. The first to n-th gate signals GIS1 to GISn may be sequentially activated during the scan period SPk.

The scan period SPk may start at a rising edge (e.g., a beginning of a pulse) of a vertical start signal STV. When the scan period SPk has started, the first gate signal GIS1 is activated first. For example, the first gate signal GIS1 may be activated first from among the first to n-th gate signals GIS1 to GISn, and the first gate signal GIS1 may activated at or after the time at which the scan period SPk starts. The node ND may be initialized at the initialization voltage Vint by the activated first gate signal GIS1. The first gate signal GIS1 is a gate signal applied to a first previous gate line GIL1.

Thereafter, the second gate signal GIS2 applied to a second previous gate line GIL2 is activated during the scan period SPk. The second transistor T2 is turned on by the second gate signal GIS2, and a data signal applied to the first data line DL1 is provided to the node ND. In some embodiments, the second previous gate line GIL2 is connected to the first current gate line GWL1 (as illustrated in FIG. 4A).

When the n-th gate signal GISn applied to an n-th previous gate line GILn is activated, the scan period SPk ends and the light emission period EPk starts. For example, the scan period SPk may end, and the light emission period EPk may begin, at a time corresponding to the end of when the n-th gate signal GISn is applied to the n-th previous gate line GILn. During the light emission period EPk, a current path is formed by a light emission control signal ES between the node ND and the light emitting element OLED. For example, during the light emission period EPk, a current path may be formed between the first power line PL1 and the light emitting element OLED. The light emission control signal ES has a low level during the light emission period EPk. As a result, the light emitting element OLED emits light during the light emission period EPk. The light emission control signal ES is deactivated during the scan period SPk. For example, the light emission control signal ES has a high level during the scan period SPk.

Figure 6A:
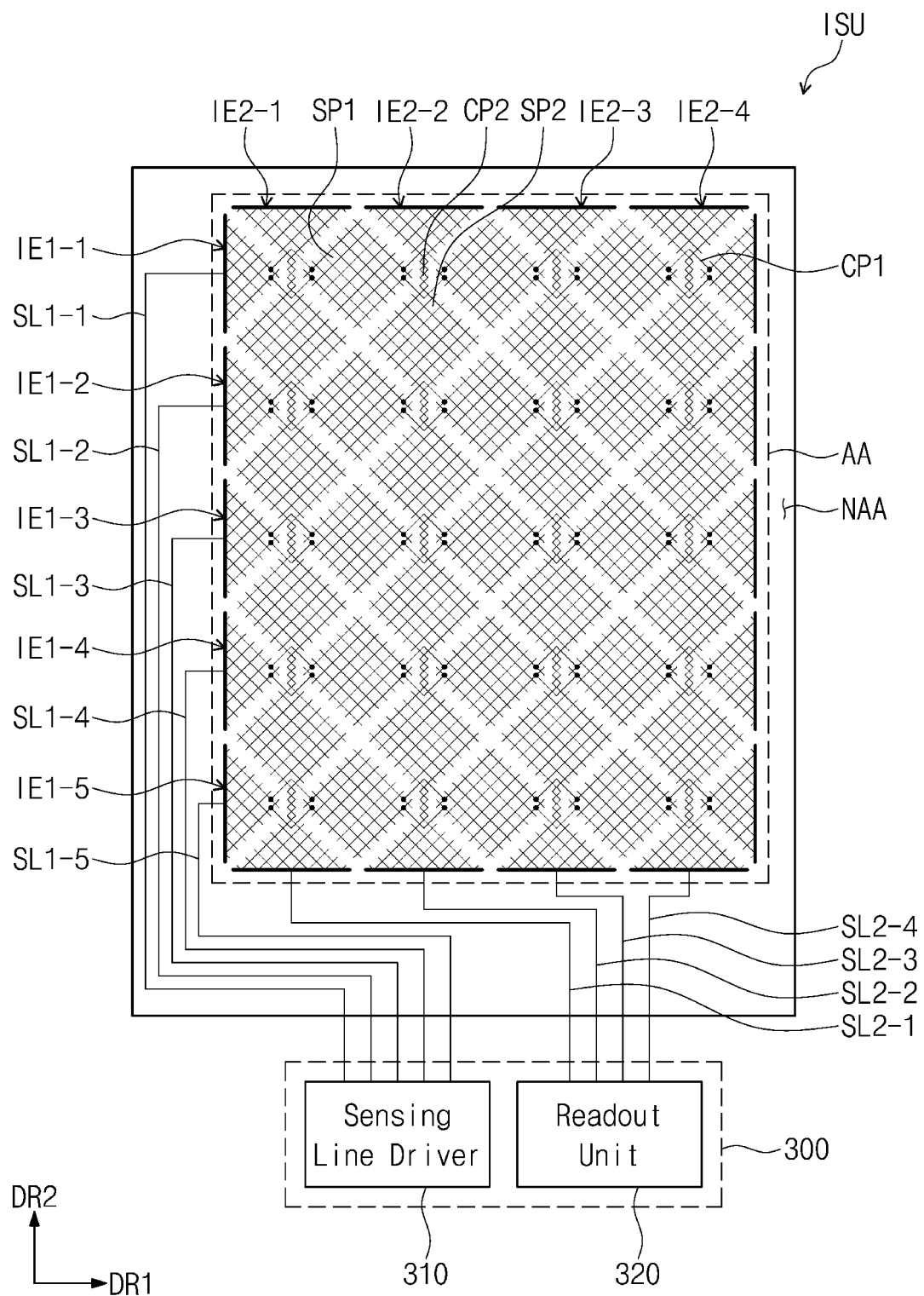
FIG. 6A is a block diagram illustrating the configuration of the second driver and the input sensing unit illustrated in FIG. 3.
Figure 6B:
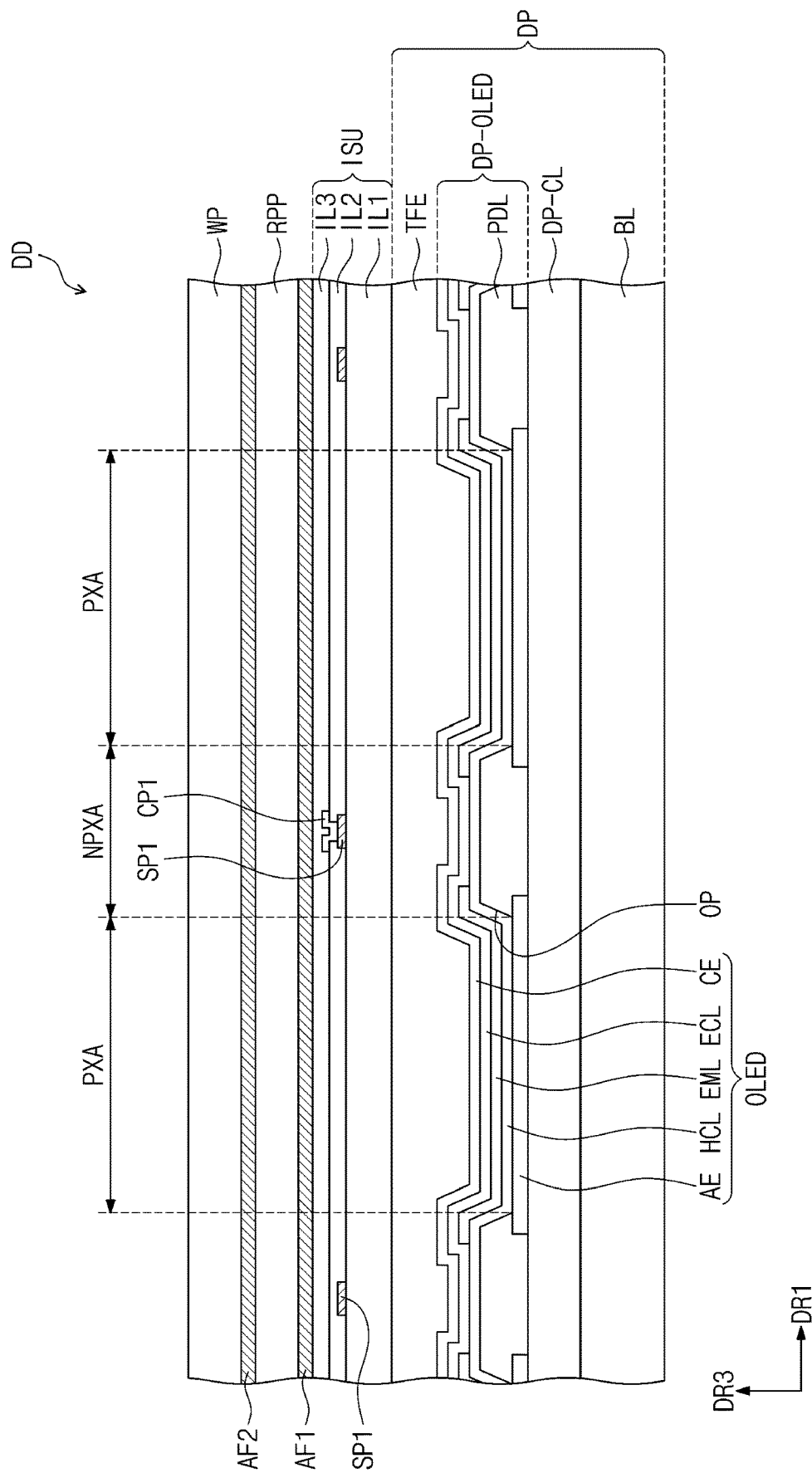
FIG. 6B is a cross-sectional view illustrating the structure of a display panel and an input sensing unit according to an embodiment of the present disclosure.

FIG. 6A is a block diagram illustrating the configuration of the second driver and the input sensing unit illustrated in FIG. 3, and FIG. 6B is a cross-sectional view illustrating the structure of a display panel and an input sensing unit according to an embodiment of the present disclosure.

Referring to FIGS. 6A and 6B, the input sensing unit ISU according to an embodiment of the present disclosure may include first sensing electrodes IE1-1 to IE1-5, first sensing lines SL1-1 to SL1-5 respectively connected to the first sensing electrodes IE1-1 to IE1-5, second sensing electrodes IE2-1 to IE2-4, and second sensing lines SL2-1 to SL2-4 respectively connected to the second sensing electrodes IE2-1 to IE2-4. The first sensing electrodes IE1-1 to IE1-5 cross the second sensing electrodes IE2-1 to IE2-4. The first sensing electrodes IE1-1 to IE1-5 are arranged in the second direction DR2, and each of the first sensing electrodes IE1-1 to IE1-5 extends in the first direction DR1.

Each of the first sensing electrodes IE1-1 to IE1-5 includes corresponding ones of first sensing portions SP1 and corresponding ones of first connecting portions CP1, with each of the first sensing portions SP1 and each of the first connecting portions CP1 disposed in the active area AA. Each of the second sensing electrodes IE2-1 to IE2-4 includes corresponding ones of second sensing portions SP2 and corresponding ones of second connecting portions CP2, with each of the second sensing portions SP2 and each of the second connecting portions CP2 disposed in the active area AA.

FIG. 6A illustrates the first sensing electrodes IE1-1 to IE1-5 and the second sensing electrodes IE2-1 to IE2-4 according to an embodiment, but the shape of the first sensing electrodes IE1-1 to IE1-5 and the second sensing electrodes IE2-1 to IE2-4 are not limited thereto. In an embodiment of the present disclosure, the first sensing electrodes IE1-1 to IE1-5 and the second sensing electrodes IE2-1 to IE2-4 may have a shape (e.g., a bar shape) in which each of the sensors and each of the connectors are not distinguished. Although exemplarily illustrated to have a rhombus shape, the first sensing portions SP1 and the second sensing portions SP2 are not limited thereto and may have any suitable shape, including a different polygonal shape.

The first sensing portions SP1 in one of the first sensing electrodes are arranged in the first direction DR1, and the second sensing portions SP2 in one of the second sensing electrodes are arranged in the second direction DR2. Each of the first connecting portions CP1 connects adjacent first sensing portions SP1, and each of the second connecting portions CP2 connects adjacent second sensing portions SP2.

The first sensing electrodes IE1-1 to IE1-5 and the second sensing electrodes IE2-1 to IE2-4 may have a mesh shape. The first sensing electrodes IE1-1 to IE1-5 and the second sensing electrodes IE2-1 to IE2-4 have a mesh shape, and thus parasitic capacitance with electrodes AE and CE of the display panel DP may be reduced. For example, parasitic capacitance between the first and second sensing electrodes IE1-1 to IE1-5 and IE2-1 to IE2-4 of the input sensing unit ISU and the electrodes AE and CE of the display panel DP may be reduced. In addition, the first sensing electrodes IE1-1 to IE1-5 and the second sensing electrodes IE2-1 to IE2-4 may not be viewed by a user of the display device DD because they do not overlap a light emitting layer EML.

The first sensing lines SL1-1 to SL1-5 are respectively connected to first ends of the first sensing electrodes IE1-1 to IE1-5. The second sensing lines SL2-1 to SL2-4 are respectively connected to first ends of the second sensing electrodes IE2-1 to IE2-4. In an embodiment of the present disclosure, the first sensing lines SL1-1 to SL1-5 may also be respectively connected to second ends (e.g., opposite ends to the first ends) of the first sensing electrodes IE1-1 to IE1-5. In addition, the second sensing lines SL2-1 to SL2-4 may also be respectively connected to second ends (e.g., opposite ends) of the second sensing electrodes IE2-1 to IE2-4. The first sensing lines SL1-1 to SL1-5 and the second sensing lines SL2-1 to SL2-4 may be disposed in the peripheral area NAA.

The second driver 300 may include a sensing line driver 310 and a readout unit 320. The sensing line driver 310 may be electrically connected to first ends of the first sensing lines SL1-1 to SL1-5, and the readout unit 320 may be electrically connected to first ends of the second sensing lines SL2-1 to SL2-4.

The sensing line driver 310 may sequentially output sensing signals to the first sensing lines SL1-1 to SL1-5 for each of sensing frame periods. The sensing signals outputted from the sensing line driver 310 may be applied to the first sensing electrodes IE1-1 to IE1-5 through the first sensing lines SL1-1 to SL1-5.

The readout unit 320 may receive an output signal read out from the second sensing lines SL2-1 to SL2-4. For example, when the sensing signals are applied to the first sensing electrodes IE1-1 to IE1-5, capacitance is formed between the first sensing electrodes IE1-1 to IE1-5 and the second sensing electrodes IE2-1 to IE2-4. When the user input TC (illustrated in FIG. 1A) is received, the capacitance between the first sensing electrodes IE1-1 to IE1-5 and the second sensing electrodes IE2-1 to IE2-4 may be changed in an area of the input sensing unit ISU (e.g., an area corresponding to the user input TC, such as a position of the user's touch). The readout unit 320 may receive such a change in capacitance as the output signal. For example, the change in capacitance may be provided to the readout unit 320 through the second sensing lines SL2-1 to SL2-4.

In the display device according to an embodiment of the present disclosure, the input sensing unit ISU may be disposed directly on the display panel DP.

As illustrated in FIG. 6B, the display element layer DP-OLED may include a pixel defining film PDL and an organic light emitting diode OLED. The pixel defining film PDL may include (e.g., be) an organic material. A first electrode AE is disposed on the display circuit layer DP-CL. The pixel defining film PDL is formed on the first electrode AE. For example, the pixel defining film PDL may be on the display circuit layer DP-CL and may cover a portion (e.g., a side) of the first electrode AE. An opening OP is defined in the pixel defining film PDL. The opening OP of the pixel defining film PDL exposes at least a portion of the first electrode AE. In an embodiment of the present disclosure, the pixel defining film PDL may be omitted.

The display panel DP may include a light emitting area PXA and a non-light emitting area NPXA adjacent to the light emitting area PXA. The light emitting area PXA may be provided in plurality. The non-light emitting area NPXA may surround the light emitting area PXA. In this embodiment, the light emitting area PXA is defined to correspond to the portion of the first electrode AE exposed by the opening OP.

A hole control layer HCL may be disposed in common in the light emitting area PXA and the non-light emitting area NPXA. For example, the hole control layer HCL may be on (e.g., may cover) the first electrode AE and the pixel defining layer PDL. The light emitting layer EML is disposed on the hole control layer HCL. The light emitting layer EML may be disposed in an area corresponding to the opening OP. Accordingly, the light emitting layer EML may be separately formed in each of the pixels PX. The light emitting layer EML may include (e.g., be) an organic material and/or an inorganic material. The light emitting layer EML may generate light of a predetermined or set color.

Although the light emitting layer EML is illustrated to be patterned in this embodiment, the light emitting layer EML may be disposed in the light emitting area PXA. In some embodiments the light emitting layer EML may be formed by forming a layer (e.g., a layer including an organic material and/or an inorganic material) on the hole control layer HCL and then patterning the layer to form the light emitting layer EML. In some embodiments, the light emitting layer EML may be formed by forming an organic material and/or an inorganic material in the light emitting area PXA. In this case, the light emitting layer EML may generate white light. Further, the light emitting layer EML may have a multilayer structure referred to as a tandem.

An electron control layer ECL is disposed on the light emitting layer EML. The electron control layer ECL may be formed in common in the light emitting area PXA and the non-light emitting area NPXA. The second electrode CE is disposed on the electron control layer ECL. The second electrode CE is disposed in common in the pixels PX.

The encapsulation layer TFE is disposed on the second electrode CE. The encapsulation layer TFE encapsulates (e.g., covers) the display element layer DP-OLED. The encapsulation layer TFE includes at least one insulating layer. The encapsulation layer TFE according to an embodiment of the present disclosure may include at least one inorganic film (hereinafter, referred to as an encapsulation inorganic film). The encapsulation layer TFE according to an embodiment of the present disclosure may include at least one organic film (hereinafter, referred to as an encapsulation organic film) and at least one encapsulation inorganic film. In some embodiments, the encapsulation inorganic film may be at the top of the encapsulation layer TFE.

The encapsulation inorganic film protects the display element layer DP-OLED from moisture and/or oxygen, and the encapsulation organic film protects the display element layer DP-OLED from foreign matter such as dust particles. The encapsulation inorganic film may include a silicon nitride layer, a silicon oxynitride layer, a silicon oxide layer, a titanium oxide layer, an aluminum oxide layer, or the like, and is not limited thereto. The encapsulation organic film may include an acrylic organic film and is not limited thereto.

The input sensing unit ISU according to an embodiment of the present disclosure includes a base layer IL1, first and second conductive layers disposed thereon, and first and second insulating layers IL2 and IL3. The base layer IL1 may include (e.g., be) an inorganic material, and may include, for example, a silicon nitride layer. The inorganic film (e.g., the encapsulation inorganic film) disposed at the top of the encapsulation layer TFE may also include (e.g., be) silicon nitride, and the silicon nitride layer of the encapsulation layer TFE and the base layer IL1 may be formed under different deposition conditions.

The first conductive layer is disposed on the base layer IL1. The first conductive layer may include the first sensing portions SP1, the second sensing portions SP2, and the second connecting portions CP2. The second conductive layer is disposed on the first conductive layer. The second conductive layer may include the first connecting portions CP1. The first insulating layer IL2 is disposed between the first conductive layer and the second conductive layer. The first conductive layer and the second conductive layer are spaced apart from and separated from each other by the first insulating layer IL2 when viewed in a cross section. Contact holes for partially exposing the first sensing portions SP1 may be provided in the first insulating layer IL2, and the first connecting portions CP1 may be connected to the first sensing portions SP1 through the contact holes. The second insulating layer IL3 is disposed on the first insulating layer IL2. The second insulating layer IL3 may cover the second conductive layer. The second insulating layer IL3 protects the second conductive layer from an external environment.

The first sensing portions SP1 do not overlap the light emitting areas PXA, and the first sensing portions SP1 overlap the non-light emitting area NPXA. Mesh lines of the first sensing portions SP1 may define a plurality of mesh holes. The mesh lines may have a three-layer structure of titanium/aluminum/titanium. The mesh holes may correspond one-to-one to the light emitting areas PXA. However, an embodiment of the present disclosure is not limited thereto. For example, each of the mesh holes may correspond to two or more light emitting areas PXA.

The anti-reflection panel RPP may be disposed on the input sensing unit ISU. As an example, the anti-reflection panel RPP may include a polarizing film. The anti-reflection panel RPP may further include a protective film and another functional film in addition to the polarizing film. A first adhesive film AF1 may be disposed between the anti-reflection panel RPP and the input sensing unit ISU. Thus, the anti-reflection panel RPP may be bonded to the input sensing unit ISU by the first adhesive film AF1. The window WP may be bonded onto the anti-reflection panel RPP by a second adhesive film AF2. The first and second adhesive films AF1 and AF2 may include an optically clear adhesive.

Figure 7A:
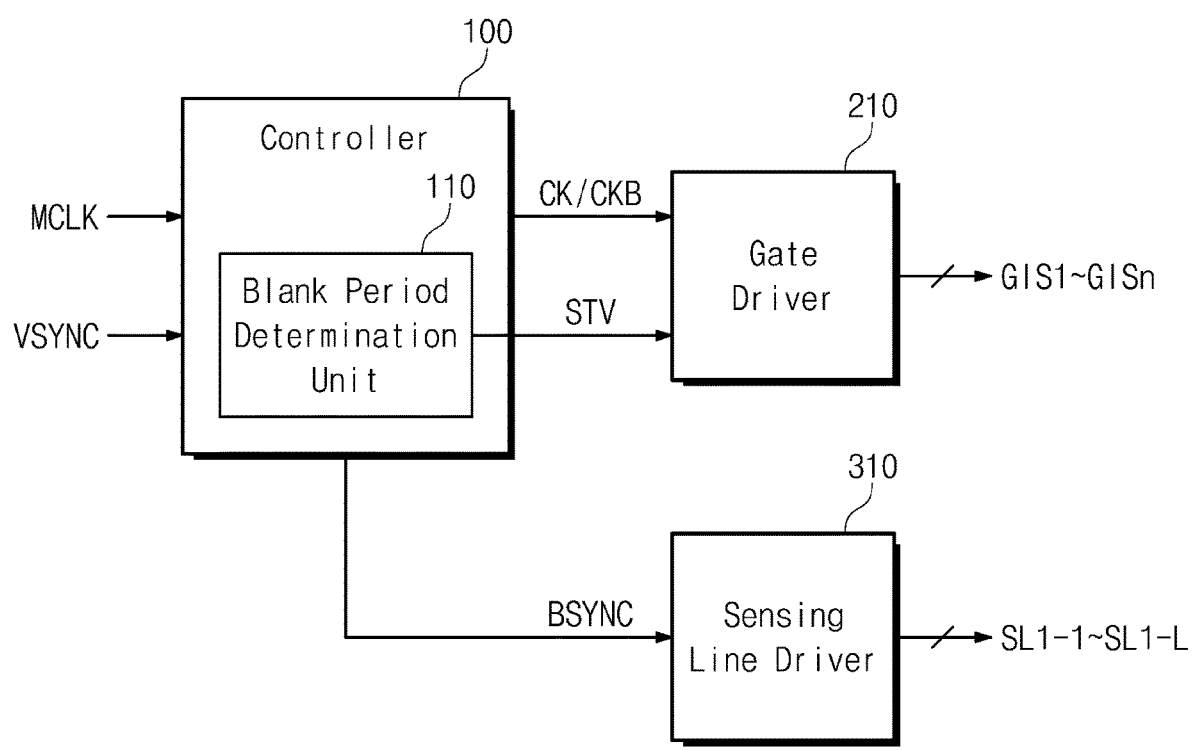
FIG. 7A is a block diagram illustrating a controller according to an embodiment of the present disclosure.
Figure 7B:
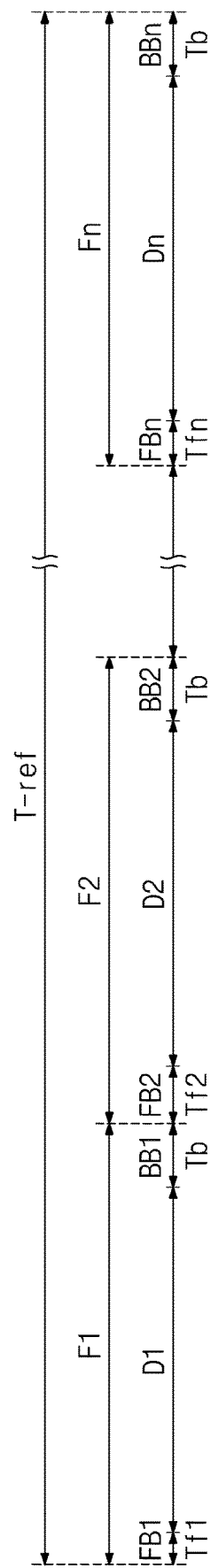
FIG. 7B is a waveform diagram illustrating n frame periods included in a reference period according to an embodiment of the present disclosure.
Figure 7C:
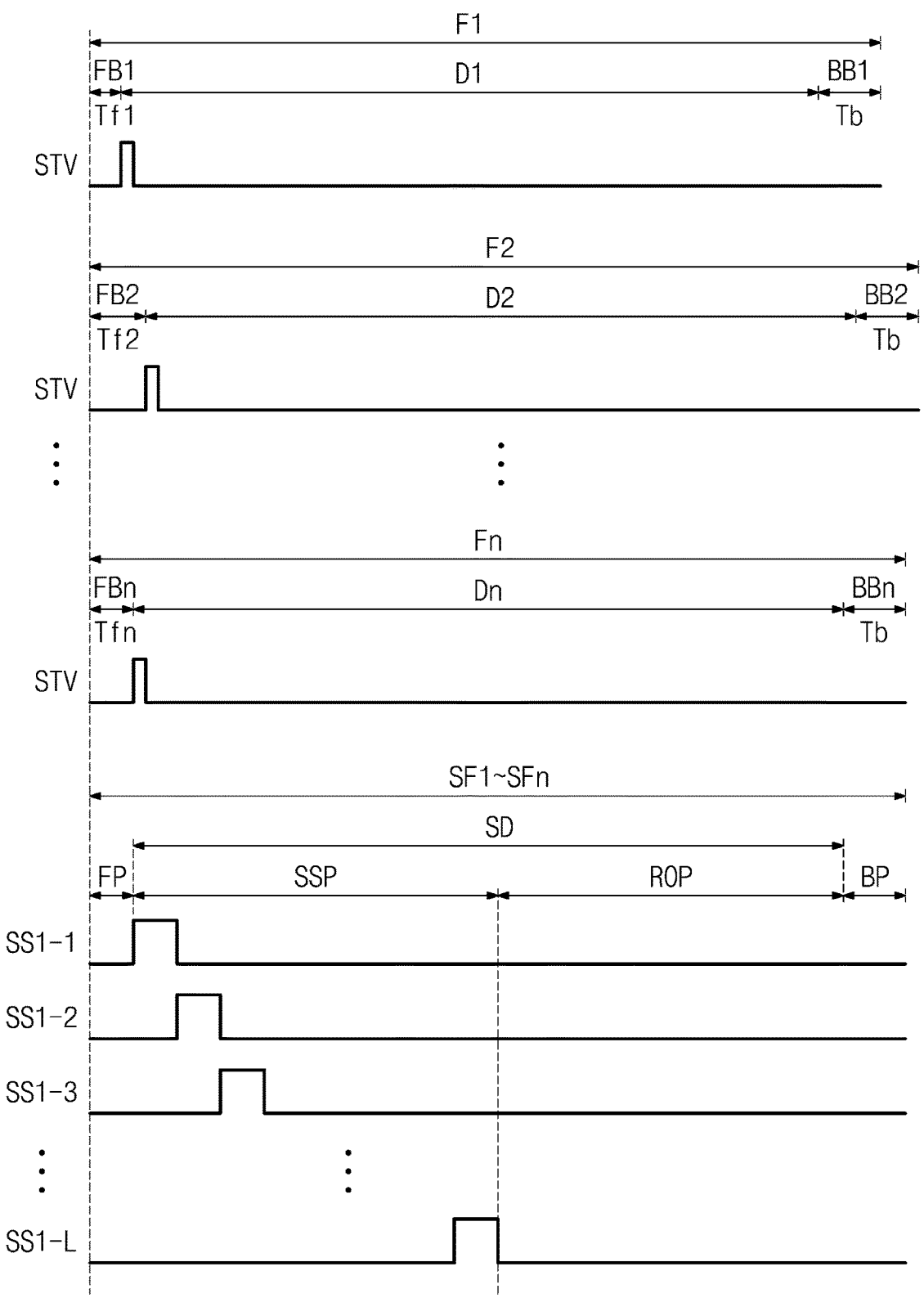
FIG. 7C is a waveform diagram illustrating each of the n frame periods illustrated in FIG. 7B.

FIG. 7A is a block diagram illustrating a controller according to an embodiment of the present disclosure. FIG. 7B is a waveform diagram illustrating n frame periods included in a reference period according to an embodiment of the present disclosure, and FIG. 7C is a waveform diagram illustrating each of the n frame periods illustrated in FIG. 7B.

Referring to FIGS. 4A and 7A, the controller 100 provides the gate control signal GCS to the gate driver 210. The gate control signal GCS may include the vertical start signal STV, a gate clock signal CK, a gate clock bar signal CKB, and the like. The controller 100 provides a sensing start signal BSYNC to the sensing line driver 310.

The controller 100 may receive a vertical synchronization signal VSYNC and a main clock signal MCLK from the outside. The controller 100 may generate the gate clock signal CK and the gate clock bar signal CKB on the basis of the main clock signal MCLK, and may generate the vertical start signal STV and the sensing start signal BSYNC on the basis of the vertical synchronization signal VSYNC.

As an embodiment of the present disclosure, the controller 100 may include a blank period determination unit 110. The blank period determination unit 110 may vary the duration of the blank periods FBk and BBk by randomly adjusting an output time of the vertical start signal STV during a preset or set reference period T-ref. For example, the blank period determination unit 110 may control the duration of the blank periods FBk and BBk. For example, the blank period determination unit 110 may randomly adjust the output time of the vertical start signal STV so that the durations of the blank periods FBk and BBK are randomly set, for example, randomly set within a set range.

As illustrated in FIG. 7B, the reference period T-ref may include n frame periods F1 to Fn (hereinafter, referred to as first to n-th frame periods F1 to Fn). Here, n may be a natural number of one or greater. For example, in the case that the display panel DP (illustrated in FIG. 4A) operates at a frequency of about 60 Hz, the reference period T-ref may include about 60 frame periods when the duration of the reference period T-ref is set to about one second. As another example, in the case that the display panel DP operates at about 120 Hz, the reference period T-ref may include about 120 frame periods when the duration of the reference period T-ref is set to about one second. In the case that the display panel DP operates at about 120 Hz, the reference period T-ref may include about 60 frame periods when the duration of the reference period T-ref is set to about 0.5 seconds. However, the duration of the reference period T-ref and the number of frame periods included in the reference period T-ref are not limited thereto and may be variously and suitably changed.

The first to n-th frame periods F1 to Fn may have different durations in the reference period T-ref. For example, the durations of the first to n-th frame periods F1 to Fn may change randomly in the reference period T-ref. For example, the duration of each of the first to n-th frame periods F1 to Fn may be randomly set within a set range.

The first frame period F1 may include a first front blank period FB1, a first display period D1, and a first back blank period BB1. The second frame period F2 may include a second front blank period FB2, a second display period D2, and a second back blank period BB2. In addition, the n-th frame period Fn may include an n-th front blank period FBn, an n-th display period Dn, and an n-th back blank period BBn.

As an example of the present disclosure, the first to n-th front blank periods FB1 to FBn may have different durations. The sum of the durations of the first to n-th front blank periods FB1 to FBn may be equal to the sum of the durations of n reference front blank periods. Here, the duration of each of the reference front blank periods may be defined as an average value of the durations of the first to n-th front blank periods FB1 to FBn.

On the other hand, the first to n-th display periods D1 to Dn may have the same duration, and the first to n-th back blank periods BB1 to BBn may have the same duration. Accordingly, because the first to n-th front blank periods FB1 to FBn have randomly varied durations in the reference period T-ref, the durations of the first to n-th frame periods F1 to Fn may vary randomly in the reference period T-ref.

Referring to FIG. 7C, the duration of each of the first to n-th front blank periods FB1 to FBn may be determined depending on an output time of the vertical start signal STV.

At a first rising edge (e.g., at a beginning of a first pulse) of the vertical start signal STV, the first display period D1 of the first frame period F1 may start. The first front blank period FB1 has a first duration Tf1 in the first frame period F1. At a second rising edge (e.g., at a beginning of a second pulse) of the vertical start signal STV, the second display period D2 of the second frame period F2 may start. In the second frame period F2, the second front blank period FB2 has a second duration Tf2, which may be different from the first duration Tf1. For example, the second duration Tf2 may be greater than the first duration Tf1. At an n-th rising edge (e.g., at a beginning of an n-th pulse) of the vertical start signal STV, the n-th display period Dn of the n-th frame period Fn may start. In the n-th frame period Fn, the n-th front blank period FBn has an n-th duration Tfn, which may be different from the first and second durations Tf1 and Tf2. For example, the n-th duration Tfn may be greater than the first duration Tf1 and may be smaller than the second duration Tf2.

The durations Tf1 to Tfn of the first to n-th front blank periods FB1 to FBn may have at least one value of a preset or set i number of values (i is a natural number of two or more). When i is equal to n, the durations Tf1 to Tfn of the first to n-th front blank periods FB1 to FBn may have different values. When i is smaller than n, however, at least two front blank periods of the first to n-th front blank periods FB1 to FBn may have the same duration.

The first to n-th display periods D1 to Dn may have the same duration, and the first to n-th back blank periods BB1 to BBn may have the same duration. In this case, the durations of the first to n-th frame periods F1 to Fn may vary depending on the durations of the first to n-th front blank periods FB1 to FBn. Accordingly, the durations of the first to n-th frame periods F1 to Fn may change randomly in the reference period T-ref. The sum of the durations of the first to n-th frame periods F1 to Fn may be equal to the sum of durations of n reference frame periods. Here, the duration of each of the reference frame periods may be determined depending on a driving frequency of the display panel DP. For example, when the driving frequency is about 60 Hz, the duration of the reference frame period may be set to about 16.7 ms, which is about 1/60 (1/60 s). For example, when the driving frequency is about 60 Hz and the duration of the reference period T-ref is about 1 s, the duration of the reference frame period may be set to about 16.7 ms, which is about 1/60 s.

As illustrated in FIG. 7C, the reference period T-ref may include n sensing frame periods SF1 to SFn (hereinafter, referred to as first to n-th sensing frame periods SF1 to SFn). For example, a case that the driving frequency of the display panel DP and a driving frequency of the input sensing unit ISU are the same is illustrated in FIG. 7C, but an embodiment of the present disclosure is not limited thereto. When the driving frequencies of the display panel DP and the input sensing unit ISU are the same, the number of the sensing frame periods SF1 to SFn included in the reference period T-ref may be the same as the number of the frame periods F1 to Fn included therein. However, when the driving frequencies of the display panel DP and the input sensing unit ISU are not the same, the number of the sensing frame periods SF1 to SFn included in the reference period T-ref may be different from the number of the frame periods F1 to Fn included therein. For example, when the display panel DP is driven at about 120 Hz and the input sensing unit ISU is driven at about 60 Hz, the reference period T-ref may include the n frame periods F1 to Fn and n/2 (½×n) number of sensing frame periods.

Each of sensing periods SD, each of porch periods FP, and each of porch periods BP may be included in a corresponding one of the sensing frame periods SF1 to SFn. The porch periods FP and BP may be disposed (e.g., occur) between the sensing periods SD and may be defined as periods in which the input sensing unit ISU does not operate. The porch periods FP and BP may include a front porch period FP disposed (e.g., occurring) before the sensing period SD and a back porch period BP disposed (e.g., occurring) after the sensing period SD.

The sensing period SD may include a sensing signal output period SSP and a readout period ROP. First to L-th sensing signals SS1-1 to SS1-L are activated during the sensing signal output period SSP. The first to L-th sensing signals SS1-1 to SS1-L may be outputted from the sensing line driver 310 and may be sequentially provided to first sensing lines SL1-1 to SL1-L provided in the input sensing unit ISU. In some embodiments, the number L may be 5, and the first to L-th sensing lines SL1-1 to SL1-L may correspond to the first to fifth sensing lines SL1-1 to SL1-5 illustrated in FIG. 6A. In this embodiment, the first to L-th sensing signals SS1-1 to SS1-L illustrated in FIG. 7C are described to be activated when the same have a high level. The first to L-th sensing signals SS1-1 to SS1-L may be sequentially activated during the sensing signal output period SSP.

When the start times of the sensing periods SD and the start times of the display periods D1 to Dn coincide with each other, coupling capacitance between the input sensing unit ISU and the display panel DP increases and thus a phenomenon that luminance of a pixel row of the display panel DP decreases may occur. When the start times of the sensing periods SD and the start times of the display periods D1 to Dn consistently coincide for tens or hundreds of frame periods, the position of a pixel row whose luminance decreases does not change and thus a horizontal line blot may appear in the display panel DP.

According to an embodiment of the present disclosure, however, the start times of the display periods D1 to Dn vary randomly during the reference period T-ref. Accordingly, during the reference period T-ref, the case that the start times of the sensing periods SD and the start times of the display periods D1 to Dn coincide with each other, and the case that the same do not coincide with each other, may occur randomly. In this case, a phenomenon that the luminance of a pixel row decreases may not be completely eliminated, but the position of the pixel row whose luminance decreases may change for each of the frame periods. Accordingly, a phenomenon that a horizontal line blot appears in the display panel DP may be prevented or reduced, because the position of a pixel row whose luminance decreases is spatially distributed for each of the frame periods. For example, the position of the pixel row whose luminance decreases may vary randomly for each of the frame periods.

Figure 8:
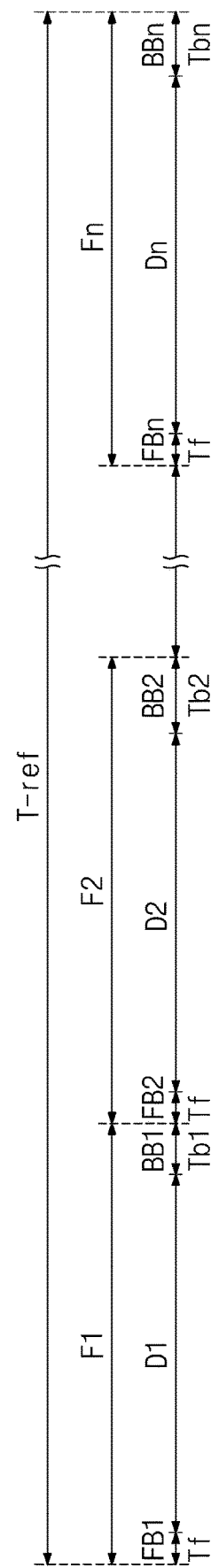
FIG. 8 is a waveform diagram illustrating n frame periods included in a reference period according to an embodiment of the present disclosure.

FIG. 8 is a waveform diagram illustrating n frame periods included in a reference period according to an embodiment of the present disclosure.

Referring to FIG. 8, the first to n-th frame periods F1 to Fn may have different durations in the reference period T-ref. For example, the durations of the first to n-th frame periods F1 to Fn may vary randomly in the reference period T-ref.

The first frame period F1 may include the first front blank period FB1, the first display period D1, and the first back blank period BB1. The second frame period F2 may include the second front blank period FB2, the second display period D2, and the second back blank period BB2. In addition, the n-th frame period Fn may include the n-th front blank period FBn, the n-th display period Dn, and the n-th back blank period BBn.

As an example of the present disclosure, the first to n-th back blank periods BB1 to BBn may have different durations. The sum of the durations of the first to n-th back blank periods BB1 to BBn may be equal to the sum of the durations of n reference back blank periods. Here, the duration of each of the reference back blank periods may be defined as an average value of the durations of the first to n-th back blank periods BB1 to BBn.

The first to n-th display periods D1 to Dn may have the same duration, and the first to n-th front blank periods FB1 to FBn may have the same duration. Accordingly, because the first to n-th back blank periods BB1 to BBn have randomly varied durations in the reference period T-ref, the durations of the first to n-th frame periods F1 to Fn may vary randomly in the reference period T-ref.

The first back blank period BB1 has a first duration Tb1 in the first frame period F1. In the second frame period F2, the second back blank period BB2 has a second duration Tb2, which may be different from the first duration Tb1. For example, the second duration Tb2 may be greater than the first duration Tb1. In the n-th frame period Fn, the n-th back blank period BBn has an n-th duration Tbn, which may be different from the first and second durations Tb1 and Tb2. For example, the n-th duration Tbn may be greater than the first duration Tb1 and may be smaller than the second duration Tb2.

The durations Tb1 to Tbn of the first to n-th back blank periods BB1 to BBn may have at least one value of a preset or set i number of values (i is a natural number of two or more). When i is equal to n, the durations Tb1 to Tbn of the first to n-th back blank periods BB1 to BBn may have different values. When i is smaller than n, however, at least two back blank periods of the first to n-th back blank periods BB1 to BBn may have the same duration.

The first to n-th display periods D1 to Dn may have the same duration, and the first to n-th front blank periods FB1 to FBn may have the same duration. In this case, the durations of the first to n-th frame periods F1 to Fn may vary depending on the durations of the first to n-th back blank periods BB1 to BBn. For example, the durations of the first to n-th frame periods F1 to Fn may vary randomly in the reference period T-ref. The sum of the durations of the first to n-th frame periods F1 to Fn may be equal to the sum of durations of n reference frame periods. Here, the duration of each of the reference frame periods may be determined depending on a driving frequency of the display panel DP. For example, when the driving frequency is about 60 Hz, the duration of the reference frame period may be set to about 16.7 ms, which is about 1/60 (1/60 s). For example, when the driving frequency is about 60 Hz and the duration of the reference period T-ref is about 1 s, the duration of the reference frame period may be set to about 16.7 ms, which is about 1/60 s.

The start times of the display periods D1 to Dn vary randomly during the reference period T-ref because the duration of the back blank period of each of the frame periods is varied (e.g., is varied randomly). Accordingly, during the reference period T-ref, the case that the start times of the sensing periods SD (refer to FIG. 7C) and the start times of the display periods D1 to Dn coincide with each other, and the case that the same do not coincide with each other, may occur randomly. In this case, a phenomenon that the luminance of a pixel row decreases may not be completely eliminated, but the position of the pixel row whose luminance decreases may change for each of the frame periods. Accordingly, a phenomenon that a horizontal line blot appears in the display panel DP may be prevented or reduced because the position of a pixel row whose luminance decreases is spatially distributed for each of the frame periods. For example, the position of the pixel row whose luminance decreases may vary randomly for each of the frame periods.

Figure 9A:
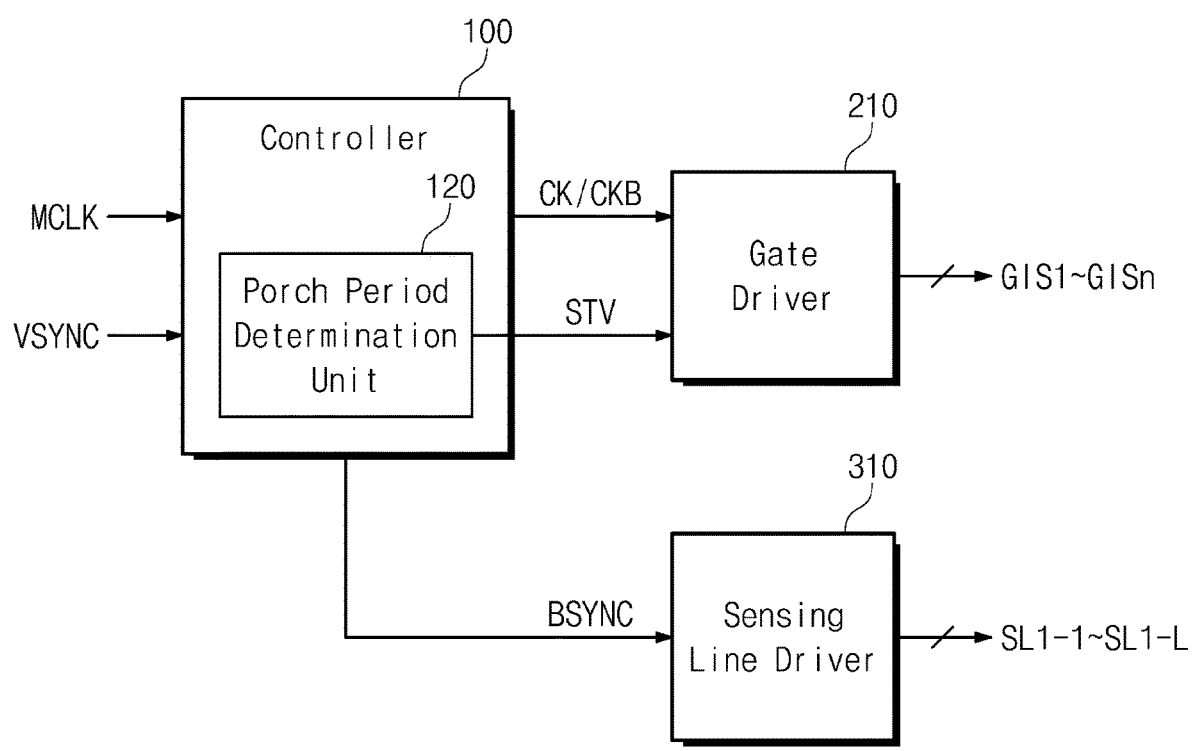
FIG. 9A is a block diagram illustrating a controller according to an embodiment of the present disclosure.
Figure 9B:
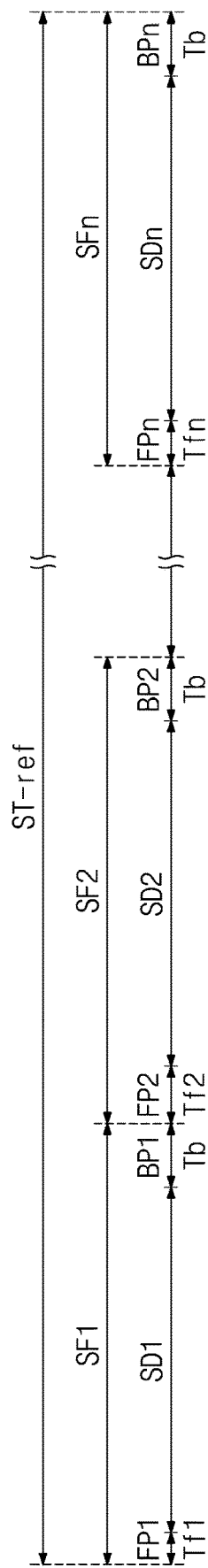
FIG. 9B is a waveform diagram illustrating n sensing frame periods included in a reference period according to an embodiment of the present disclosure.
Figure 9C:
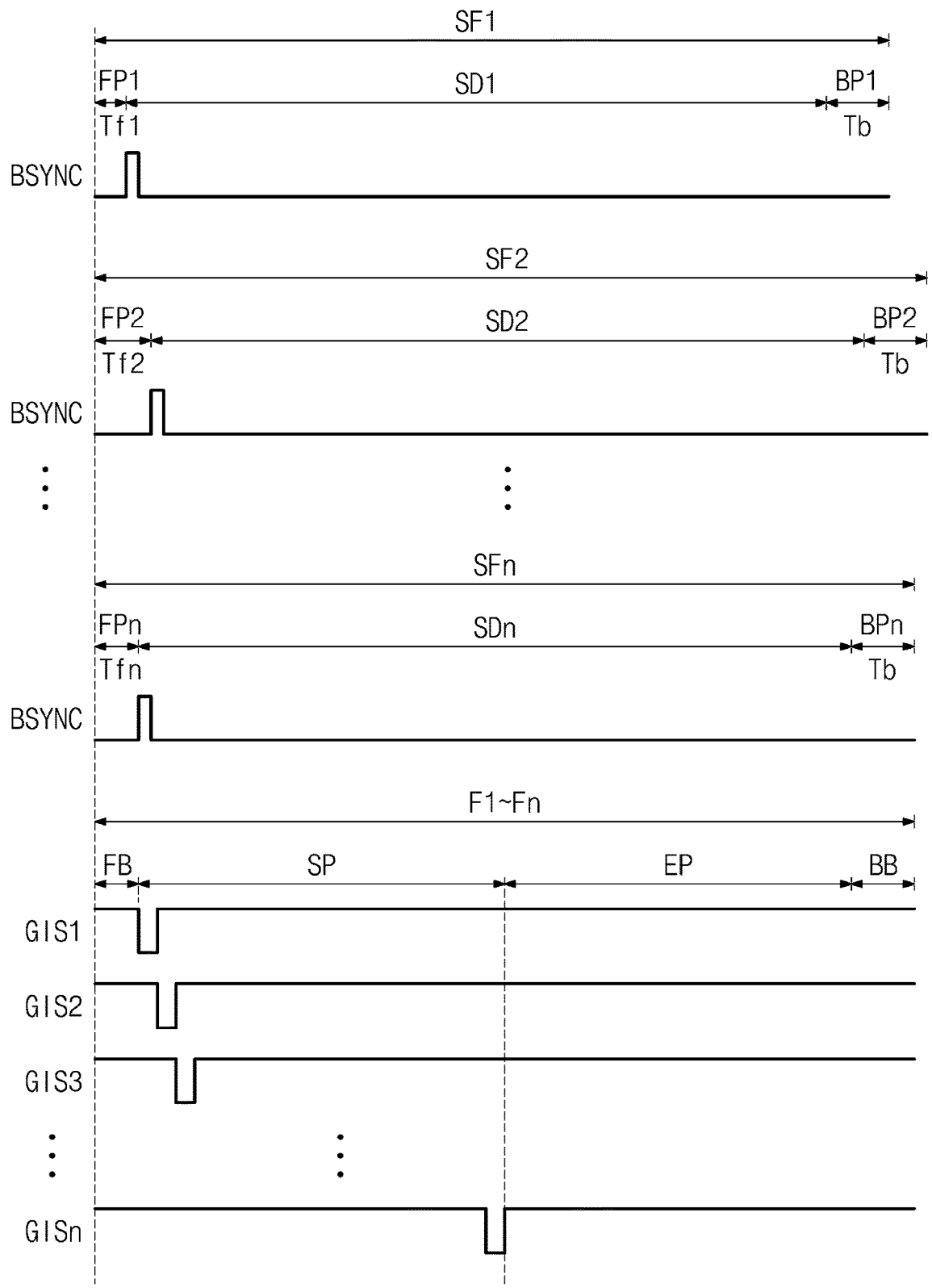
FIG. 9C is a waveform diagram illustrating each of the n sensing frame periods illustrated in FIG. 9B.

FIG. 9A is a block diagram illustrating a controller according to an embodiment of the present disclosure. FIG. 9B is a waveform diagram illustrating n sensing frame periods included in a reference period according to an embodiment of the present disclosure, and FIG. 9C is a waveform diagram illustrating each of the n sensing frame periods illustrated in FIG. 9B.

Referring to FIG. 9A, a controller 100 provides the gate control signal GCS to the gate driver 210. The gate control signal GCS may include the vertical start signal STV, the gate clock signal CK, the gate clock bar signal CKB, and the like. The controller 100 provides the sensing start signal BSYNC to the sensing line driver 310.

As an example of the present disclosure, the controller 100 may include a porch period determination unit 120. The porch period determination unit 120 may vary the duration of the porch periods FP and BP by randomly adjusting an output time of the sensing start signal BSYNC during a preset or set reference period ST-ref. For example, the porch period determination unit 120 may control the duration of the porch periods FP and BP. For example, the porch period determination unit 120 may randomly adjust the output time of the sensing start signal BSYNC so that the durations of the porch periods FP and BP are randomly set, for example, randomly set within a set range.

As illustrated in FIGS. 6A and 9B, the reference period ST-ref may include the n sensing frame periods SF1 to SFn (hereinafter, referred to as the first to n-th sensing frame periods SF1 to SFn). Here, n may be a natural number of one or greater. As an example of the present disclosure, in the case that the input sensing unit ISU operates at about 60 Hz, the reference period ST-ref may include about 60 sensing frame periods when the duration of the reference period ST-ref is set to about one second. As another example, in the case that the input sensing unit ISU operates at about 120 Hz, the reference period ST-ref may include about 120 sensing frame periods when the duration of the reference period ST-ref is set to about one second. In the case that the input sensing unit ISU operates at about 120 Hz, the reference period ST-ref may include about 60 sensing frame periods when the duration of the reference period ST-ref is set to about 0.5 seconds. However, the duration of the reference period ST-ref and the number of sensing frame periods included in the reference period ST-ref are not limited thereto and may be variously and suitably changed.

The first to n-th sensing frame periods SF1 to SFn may have different durations in the reference period ST-ref. For example, the durations of the first to n-th sensing frame periods SF1 to SFn may vary randomly in the reference period ST-ref. For example, the durations of the first to n-th sensing frame periods SF1 to SFn may be randomly set within a set range.

The first sensing frame period SF1 may include a first front porch period FP1, a first sensing period SD1, and a first back porch period BP1. The second sensing frame period SF2 may include a second front porch period FP2, a second sensing period SD2, and a second back porch period BP2. In addition, the n-th sensing frame period SFn may include an n-th front porch period FPn, an n-th sensing period SDn, and an n-th back porch period BPn.

As an example of the present disclosure, the first to n-th front porch periods FP1 to FPn may have different durations. The sum of the durations of the first to n-th front porch periods FP1 to FPn may be equal to the sum of the durations of n reference front porch periods. Here, the duration of each of the reference front porch periods may be defined as an average value of the durations of the first to n-th front porch periods FP1 to FPn.

The first to n-th sensing periods SD1 to SDn may have the same duration, and the first to n-th back porch periods BP1 to BPn may have the same duration. Accordingly, because the first to n-th front porch periods FP1 to FPn have randomly varied durations in the reference period ST-ref, the durations of the first to n-th sensing frame periods SF1 to SFn may vary randomly in the reference period ST-ref.

Referring to FIG. 9C, the duration of each of the first to n-th front porch periods FP1 to FPn may be determined depending on an output time of the sensing start signal BSYNC.

At a first rising edge (e.g., at a beginning of a first pulse) of the sensing start signal BSYNC, the first sensing period SD1 of the first sensing frame period SF1 may start. The first front porch period FP1 has a first duration Tf1 in the first sensing frame period SF1. At a second rising edge (e.g., at a beginning of a second pulse) of the sensing start signal BSYNC, the second sensing period SD2 of the second sensing frame period SF2 may start. In the second sensing frame period SF2, the second front porch period FP2 has a second duration Tf2, which may be different from the first duration Tf1. For example, the second duration Tf2 may be greater than the first duration Tf1. At an n-th rising edge (e.g., at a beginning of an n-th pulse) of the sensing start signal BSYNC, the n-th sensing period SDn of the n-th sensing frame period SFn may start. In the n-th sensing frame period SFn, the n-th front porch period FPn has an n-th duration Tfn, which may be different from the first and second durations Tf1 and Tf2. For example, the n-th duration Tfn may be greater than the first duration Tf1 and may be smaller than the second duration Tf2.

The durations Tf1 to Tfn of the first to n-th front porch periods FP1 to FPn may have at least one value of a preset or set i number of values (i is a natural number of two or more). When i is equal to n, the durations Tf1 to Tfn of the first to n-th front porch periods FP1 to FPn may have different values. When i is smaller than n, however, at least two front porch periods of the first to n-th front porch periods FP1 to FPn may have the same duration.

The first to n-th sensing periods SD1 to SDn may have the same duration, and the first to n-th back porch periods BP1 to BPn may have the same duration. In this case, the durations of the first to n-th sensing frame periods SF1 to SFn may vary depending on the durations of the first to n-th front porch periods FP1 to FPn. For example, the durations of the first to n-th sensing frame periods SF1 to SFn may vary randomly in the reference period ST-ref (refer to FIG. 9B). The sum of the durations of the first to n-th sensing frame periods SF1 to SFn may be equal to the sum of durations of n reference sensing frame periods. Here, the duration of each of the reference sensing frame periods may be determined depending on a driving frequency of the input sensing unit ISU. For example, when the driving frequency is about 60 Hz, the duration of the reference sensing frame period may be set to about 16.7 ms, which is about ⅟60 (⅟60 s). For example, when the driving frequency is about 60 Hz and the duration of the reference sensing period ST-ref is about 1 s, the duration of the reference frame period may be set to about 16.7 ms, which is about ⅟60 s.

As illustrated in FIG. 9C, the reference period ST-ref may include the n frame periods F1 to Fn. For example, the driving frequencies of the display panel DP and the input sensing unit ISU are illustrated to be the same in FIG. 9C, but an embodiment of the present disclosure is not limited thereto. When the driving frequencies of the display panel DP and the input sensing unit ISU are the same, the number of the sensing frame periods SF1 to SFn included in the reference period ST-ref may be the same as the number of the frame periods F1 to Fn included therein. However, when the driving frequencies of the display panel DP and the input sensing unit ISU are not the same, the number of the sensing frame periods SF1 to SFn included in the reference period ST-ref may be different from the number of the frame periods F1 to Fn included therein. For example, when the display panel DP is driven at about 120 Hz and the input sensing unit ISU is driven at about 60 Hz, the reference period ST-ref may include the n sensing frame periods SF1 to SFn and may include 2n frame periods.

Each of scan periods SP, each of light emission periods EP, each of blank periods FB, and each of blank periods BB may be included in a corresponding one of the frame periods F1 to Fn. The blank periods FB and BB may be defined as periods in which the display panel DP does not operate. The blank periods FB and BB may include a front blank period FB and a back blank period BB.

When the start times of the scan periods SP and the start times of the first to n-th sensing periods SD1 to SDn coincide with each other, coupling capacitance between the input sensing unit ISU and the display panel DP increases, and thus a phenomenon that the luminance of a pixel row of the display panel DP decreases may occur. When the start times of the scan periods SP and the start times of the first to n-th sensing periods SD1 to SDn consistently coincide for tens or hundreds of frame periods, the position of a pixel row whose luminance decreases does not change and thus a horizontal line blot may appear in the display panel DP.

According to an embodiment of the present disclosure, however, the start times of the sensing periods SD1 to SDn vary randomly during the reference period ST-ref. Accordingly, during the reference period ST-ref, the case that the start times of the scan periods SP and the start times of the first to n-th sensing periods SD1 to SDn coincide with each other, and the case that the same do not coincide with each other, may occur randomly. In this case, a phenomenon that the luminance of a pixel row decreases may not be completely eliminated, but the position of the pixel row whose luminance decreases may change for each of the frame periods. Accordingly, a phenomenon that a horizontal line blot appears in the display panel DP may be prevented or reduced because the position of a pixel row whose luminance decreases changes for each of the frame periods. For example, the position of the pixel row whose luminance decreases may vary randomly for each of the frame periods.

Figure 10:
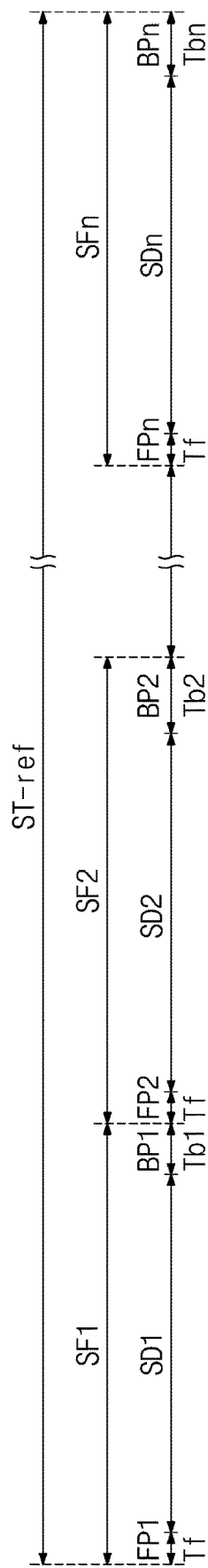
FIG. 10 is a waveform diagram illustrating n sensing frame periods included in a reference period according to an embodiment of the present disclosure.

FIG. 10 is a waveform diagram illustrating n sensing frame periods included in a reference period according to an embodiment of the present disclosure.

Referring to FIG. 10, the first to n-th sensing frame periods SF1 to SFn may have different durations in the reference period ST-ref. For example, the durations of the first to n-th sensing frame periods SF1 to SFn may vary randomly in the reference period ST-ref.

As an example of the present disclosure, the first to n-th back porch periods BP1 to BPn may have different durations. The sum of the durations of the first to n-th back porch periods BP1 to BPn may be equal to the sum of the durations of n reference back porch periods. Here, the duration of each of the reference back porch periods may be defined as an average value of the durations of the first to n-th back porch periods BP1 to BPn.

The first to n-th sensing periods SD1 to SDn may have the same duration, and the first to n-th front porch periods FP1 to FPn may have the same duration. Accordingly, because the first to n-th back porch periods BP1 to BPn have randomly varied durations in the reference period ST-ref, the durations of the first to n-th sensing frame periods SF1 to SFn may vary randomly in the reference period ST-ref.

The first back porch period BP1 has a first duration Tb1 in the first sensing frame period SF1. In the second sensing frame period SF2, the second back porch period BP2 has a second duration Tb2, which may be different from the first duration Tb1. For example, the second duration Tb2 may be greater than the first duration Tb1. In the n-th sensing frame period SFn, the n-th back porch period BPn has an n-th duration Tbn, which may be different from the first and second durations Tb1 and Tb2. For example, the n-th duration Tbn may be greater than the first duration Tb1 and may be smaller than the second duration Tb2.

The durations Tb1 to Tbn of the first to n-th back porch periods BP1 to BPn may have at least one value of a preset or set i number of values (i is a natural number of two or more). When i is equal to n, the durations Tb1 to Tbn of the first to n-th back porch periods BP1 to BPn may have different values. When i is smaller than n, however, at least two back porch periods of the first to n-th back porch periods BP1 to BPn may have the same duration.

The first to n-th sensing periods SD1 to SDn may have the same duration, and the first to n-th front porch periods FP1 to FPn may have the same duration. In this case, the durations of the first to n-th sensing frame periods SF1 to SFn may vary depending on the durations of the first to n-th back porch periods BP1 to BPn. For example, the durations of the first to n-th sensing frame periods SF1 to SFn may vary randomly in the reference period ST-ref. The sum of the durations of the first to n-th sensing frame periods SF1 to SFn may be equal to the sum of the durations of n reference sensing frame periods. Here, the duration of each of the reference sensing frame periods may be determined depending on the driving frequency of the input sensing unit ISU. For example, when the driving frequency is about 60 Hz, the duration of the reference sensing frame period may be set to about 16.7 ms, which is about 1/60 (1/60 s). For example, when the driving frequency is about 60 Hz and the duration of the reference period ST-ref is about 1 s, the duration of the reference sensing frame period may be set to about 16.7 ms, which is about 1/60 s.

The start times of the sensing periods SD1 to SDn vary randomly during the reference period ST-ref because the duration of the back porch period of each of the sensing frame periods is varied. Accordingly, during the reference period ST-ref, the case that the start times of the sensing periods SD1 to SDn and the start times of the scan periods SP (illustrated in FIG. 9C) coincide with each other, and the case that the same do not coincide with each other, may occur randomly. In this case, a phenomenon that the luminance of a pixel row decreases may not be completely eliminated, but the position of the pixel row whose luminance decreases may change for each of the frame periods. Accordingly, a phenomenon that a horizontal line blot appears in the display panel DP may be prevented or reduced because the position of a pixel row whose luminance decreases changes for each of the frame periods. For example, the position of the pixel row whose luminance decreases may vary randomly for each of the frame periods According to the display device of an embodiment of the present disclosure, by randomly varying the duration of the blank period included in a frame period during the preset or set reference period, positions of pixels whose luminance decreases due to coupling capacitance between the display panel and the input sensing unit may be spatially distributed (e.g., may vary randomly over time) in the display panel.

Accordingly, a phenomenon that luminance decrease in a pixel row occurs continuously, and thus a horizontal line blot is viewed in the display panel, may be prevented or reduced.

Although the example embodiments of the present disclosure have been described herein, it is understood that various and suitable changes and modifications can be made by those skilled in the art within the spirit and scope of the present disclosure defined by the following claims and the equivalents thereof.

Therefore, the example embodiments described herein are not intended to limit the technical spirit and scope of the present disclosure, and all technical spirit within the scope of the following claims and the equivalents thereof will be construed as being included in the scope of the present disclosure.

What is claimed is:

1. A display device comprising:
   a display panel configured to display an image for each frame period of frame periods;
   an input sensing unit on the display panel to sense a user input;
   a first driver configured to control driving of the display panel; and
   a second driver configured to control driving of the input sensing unit,
   wherein the frame period comprises a display period and a blank period adjacent to the display period,
   a duration of the blank period varies randomly during a set reference period,
   wherein the reference period comprises n frame periods of the frame periods, and
   wherein a duration of each of the n frame periods is randomly varied by the duration of the blank period.

2. The display device of claim 1, further comprising a controller configured to control driving of the first and second drivers,
   wherein the controller comprises a blank period determination unit configured to control the duration of the blank period during the reference period.

3. The display device of claim 2, wherein the blank period comprises a front blank period before the display period and a back blank period after the display period.

4. The display device of claim 3, wherein the blank period determination unit is configured to randomly vary a duration of the front blank period during the reference period.

5. The display device of claim 3, wherein the blank period determination unit is configured to randomly vary a duration of the back blank period during the reference period.

6. The display device of claim 1, wherein a sum of durations of the n frame periods is equal to a sum of durations of n reference frame periods.

7. The display device of claim 6, wherein a duration of each of the n reference frame periods is set depending on a driving frequency of the display panel.

8. The display device of claim 1, wherein the display period has a constant duration during the reference period.

9. The display device of claim 1, wherein the display panel comprises:
   a plurality of pixels;
   a plurality of gate lines connected to the plurality of pixels; and
   a plurality of data lines connected to the plurality of pixels,
   wherein the first driver comprises:
   a gate driver configured to drive the plurality of gate lines;
   a data driver configured to drive the plurality of data lines; and
   a controller configured to control driving of the gate driver and the data driver.

10. The display device of claim 9, wherein the gate driver is configured to start to drive each of the gate lines by receiving a vertical start signal from the controller, and
    the controller is configured to randomly vary an output time of the vertical start signal during the set reference period.

11. The display device of claim 1, wherein the display panel comprises:
    a plurality of pixels that each include a light emitting element to generate light and display an image; and
    a thin film encapsulation layer configured to cover the plurality of pixels.

12. The display device of claim 11, wherein the input sensing unit is directly on the thin film encapsulation layer.

13. A display device comprising:
    a display panel configured to display an image;
    an input sensing unit directly on the display panel and configured to sense a user input for each sensing frame period of sensing frame periods;
    a first driver configured to control driving of the display panel; and
    a second driver configured to control driving of the input sensing unit,
    wherein the sensing frame period comprises a sensing period and a porch period adjacent to the sensing period,
    a duration of the porch period varies randomly during a set reference period,
    wherein the reference period comprises n sensing frame periods of the sensing frame periods, and
    wherein a duration of each of the n sensing frame periods is randomly varied by the duration of the porch period.

14. The display device of claim 13, further comprising a controller configured to control driving of the first and second drivers,
    wherein the controller comprises a porch period determination unit configured to control the duration of the porch period during the reference period.

15. The display device of claim 14, wherein the porch period comprises a front porch period before the sensing period and a back porch period after the sensing period.

16. The display device of claim 15, wherein the porch period determination unit randomly varies a duration of the front porch period during the reference period.

17. The display device of claim 15, wherein the porch period determination unit randomly varies a duration of the back porch period during the reference period.

18. The display device of claim 13, wherein the input sensing unit comprises:
    first sensing electrodes;
    first sensing lines connected to the first sensing electrodes;
    second sensing electrodes configured to form capacitance with the first sensing electrodes; and
    second sensing lines connected to the second sensing electrodes.

19. The display device of claim 18, wherein the second driver comprises:
    a sensing line driver connected to an end of each of the first sensing lines and configured to sequentially output sensing signals to the first sensing lines; and a readout unit connected to an end of each of the second sensing lines and configured to read out an output signal from the second sensing lines.

\* \* \* \* \*